US012523957B2

(12) United States Patent
Kajimoto

(10) Patent No.: US 12,523,957 B2
(45) Date of Patent: Jan. 13, 2026

(54) IMAGE PROCESSING APPARATUS CAPABLE OF PERFORMING PRINTING WITH DECOLORING TONER, METHOD OF CONTROLLING IMAGE PROCESSING APPARATUS, AND STORAGE MEDIUM

(71) Applicant: CANON KABUSHIKI KAISHA, Tokyo (JP)

(72) Inventor: Masahiro Kajimoto, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1 day.

(21) Appl. No.: 18/739,660

(22) Filed: Jun. 11, 2024

(65) Prior Publication Data

US 2024/0419101 A1 Dec. 19, 2024

(30) Foreign Application Priority Data

Jun. 15, 2023 (JP) ................................ 2023-098523

(51) Int. Cl.
*G03G 15/00* (2006.01)
*G03G 21/02* (2006.01)

(52) U.S. Cl.
CPC ..... *G03G 15/5016* (2013.01); *G03G 15/6585* (2013.01); *G03G 21/02* (2013.01)

(58) Field of Classification Search
CPC . G03G 15/5016; G03G 15/6585; G03G 21/02
USPC .................................... 399/43, 81, 223, 228
See application file for complete search history.

(56) References Cited

U.S. PATENT DOCUMENTS 7,499,655 B2 3/2009 Yamauchi et al.
10,245,872 B2 * 4/2019 Shimada ................ G03G 15/50
2012/0327487 A1 * 12/2012 Kamisuwa ........... H04N 1/2338 358/527
2013/0016376 A1 * 1/2013 Hashidume ............ G03G 15/01 358/1.9
2013/0070266 A1 * 3/2013 Hagiwara .......... G03G 15/6585 358/1.9
2019/0270331 A1 * 9/2019 Tsueda .................. G06F 3/1285

FOREIGN PATENT DOCUMENTS

JP 2006154485 A 6/2006

* cited by examiner

*Primary Examiner* — Robert B Beatty
(74) *Attorney, Agent, or Firm* — ROSSI, KIMMS & McDOWELL LLP

(57) ABSTRACT

An image processing apparatus that is capable of performing image formation on recording sheets, by switchingly using decoloring toner and normal toner. The number of sheets printed with the decoloring toner and the number of sheets printed with the normal toner are counted with respect to the recording sheets on a user-by-user basis. A use ratio of a logged-in user who has logged in the image processing apparatus is acquired, which indicates a ratio of the number of sheets printed with the decoloring toner to a total number of the number of sheets printed with the decoloring toner and the number of sheets printed with the normal toner based on the count. In a case where the use ratio is equal to or lower than a first threshold value, a notification for recommending printing using the decoloring toner is provided to the logged-in user.

19 Claims, 23 Drawing Sheets

| No. | USER ID (301) | NORMAL TONER PRINTS NUMBER (302) | DECOLORING TONER PRINTS NUMBER (303) | TOTAL PRINT NUMBER (304) | DECOLORING TONER PRINTING USE RATIO (305) |
|---|---|---|---|---|---|
| 1 | USER A | 30 | 50 | 80 | 62.5% |
| 2 | USER B | 80 | 0 | 80 | 0% |
| 3 | USER C | 10 | 90 | 100 | 90% |
| ... | ... | ... | ... | ... | ... |

*FIG. 3*

| No. | USER ID (301) | NORMAL TONER PRINTS NUMBER (302) | DECOLORING TONER PRINTS NUMBER (303) | TOTAL PRINT NUMBER (304) | DECOLORING TONER PRINTING USE RATIO (305) |
|---|---|---|---|---|---|
| 1 | USER A | 30 | 50 | 80 | 62.5% |
| 2 | USER B | 80 | 0 | 80 | 0% |
| 3 | USER C | 10 | 90 | 100 | 90% |
| ... | ... | ... | ... | ... | ... |

FIG. 6

301 601 602 302 603 604 303 605 606 304 607

| No. | USER ID | NORMAL TONER PRINTS NUMBER | | | DECOLORING TONER PRINTS NUMBER | | | TOTAL PRINT NUMBER | | | REUSE SHEET USE RATIO FOR DECOLORING TONER PRINTING |
|---|---|---|---|---|---|---|---|---|---|---|---|
| | | NEW SHEETS | REUSE SHEETS | SUM | NEW SHEETS | REUSE SHEETS | SUM | NEW SHEETS | REUSE SHEETS | SUM | |
| 1 | USER A | 10 | 20 | 30 | 25 | 25 | 50 | 35 | 45 | 80 | 50% |
| 2 | USER B | 40 | 40 | 80 | 0 | 0 | 0 | 40 | 40 | 80 | 0% (NO DATA) |
| 3 | USER C | 10 | 0 | 10 | 80 | 10 | 90 | 90 | 10 | 100 | 11.1% |
| ... | ... | ... | ... | ... | ... | ... | ... | ... | ... | ... | ... |

FIG. 9

| No. | USER ID (301) | NORMAL TONER PRINTS NUMBER (602) | | | DECOLORING TONER PRINTS NUMBER (604) | | | TOTAL PRINT NUMBER (606) | | | UPPER LIMIT OF NUMBER OF PRINTABLE SHEETS (901) | NUMBER OF REMAINING PRINTABLE SHEETS (902) |
|---|---|---|---|---|---|---|---|---|---|---|---|---|
| | | NEW SHEETS (601) | REUSE SHEETS | SUM (302) | NEW SHEETS (603) | REUSE SHEETS | SUM (303) | NEW SHEETS (605) | REUSE SHEETS | SUM (304) | | |
| 1 | USER A | 10 | 20 | 30 | 25 | 25 | 50 | 35 | 45 | 80 | 1000 | 970 |
| 2 | USER B | 40 | 40 | 80 | 0 | 0 | 0 | 40 | 40 | 80 | 1000 | 920 |
| 3 | USER C | 10 | 0 | 10 | 80 | 10 | 90 | 90 | 10 | 100 | 1000 | 990 |
| ... | ... | ... | ... | ... | ... | ... | ... | ... | ... | ... | ... | ... |

FIG. 12

301 601 602 302 603 604 303 605 606 304 305 1201 607 1202 1203

| No. | USER ID | NORMAL TONER PRINTS NUMBER | | | DECOLORING TONER PRINTS NUMBER | | | TOTAL PRINT NUMBER | | | DECOLORING TONER PRINTING USE RATIO | | REUSE SHEET USE RATIO FOR DECOLORING TONER PRINTING | | TOTAL SCORE |
|---|---|---|---|---|---|---|---|---|---|---|---|---|---|---|---|
| | | NEW SHEETS | REUSE SHEETS | SUM | NEW SHEETS | REUSE SHEETS | SUM | NEW SHEETS | REUSE SHEETS | SUM | ACTUAL VALUE | SCORE | ACTUAL VALUE | SCORE | |
| 1 | USER A | 10 | 20 | 30 | 25 | 25 | 50 | 35 | 45 | 80 | 62.5% | 30 | 50% | 20 | 50 |
| 2 | USER B | 40 | 40 | 80 | 0 | 0 | 0 | 40 | 40 | 80 | 0% | 10 | 0% (NO DATA) | 10 | 20 |
| 3 | USER C | 10 | 0 | 10 | 80 | 10 | 90 | 90 | 10 | 100 | 90% | 40 | 11.1% | 10 | 50 |
| ... | ... | ... | ... | ... | ... | ... | ... | ... | ... | ... | ... | ... | ... | ... | ... |

IMAGE PROCESSING APPARATUS CAPABLE OF PERFORMING PRINTING WITH DECOLORING TONER, METHOD OF CONTROLLING IMAGE PROCESSING APPARATUS, AND STORAGE MEDIUM

BACKGROUND OF THE INVENTION

Field of the Invention

The present invention relates to an image processing apparatus that is capable of performing printing with normal toner and decoloring toner, a method of controlling the image processing apparatus, and a storage medium.

Description of the Related Art

A technique for separately counting the number of sheets printed with normal toner and the number of sheets printed with decoloring toner and performing calculation of the remaining amount of consumables and adjustment of process conditions based on the respective toner characteristics is disclosed in Japanese Laid-Open Patent Publication (Kokai) NO. 2006-154485. According to the technique disclosed in Japanese Laid-Open Patent Publication (Kokai) NO. 2006-154485, it is possible to make effective use of a variety of consumables and perform printing with high image quality suitable for a toner type.

By separately counting the number of sheets printed with the normal toner and the number of sheets printed with the decoloring toner, it is possible, for example, to estimate the use awareness of a user who uses the decoloring toner printing. However, the use awareness of a user who uses the decoloring toner printing is different from one user to another, and hence it is impossible for the technique described in Japanese Laid-Open Patent Publication (Kokai) NO. 2006-154485 to promote the use of the decoloring toner printing to a user who does not use or seldom uses the decoloring toner printing.

SUMMARY OF THE INVENTION

The present invention provides a technique for promoting use of the decoloring toner printing.

In a first aspect of the present invention, there is provided an image processing apparatus that is capable of performing image formation on recording sheets, by switchingly using decoloring toner and normal toner, including a count unit configured to count the number of sheets printed with the decoloring toner and the number of sheets printed with the normal toner with respect to the recording sheets on a user-by-user basis, an acquisition unit configured to acquire a first use ratio of a logged-in user who has logged in the image processing apparatus, the first use ratio indicating a ratio of the number of sheets printed with the decoloring toner to a total number of the number of sheets printed with the decoloring toner and the number of sheets printed with the normal toner, based on counts counted by the count unit, and a notification unit configured to provide a first notification for recommending printing using the decoloring toner to the logged-in user in a case where the first use ratio is equal to or lower than a first threshold value.

In a second aspect of the present invention, there is provided a method of controlling an image processing apparatus that is capable of performing image formation on recording sheets, by switchingly using decoloring toner and normal toner, including counting the number of sheets printed with the decoloring toner and the number of sheets printed with the normal toner, with respect to the recording sheets, on a user-by-user basis, acquiring a decoloring toner use ratio of a logged-in user who has logged in the image processing apparatus, the decoloring toner use ratio indicating a ratio of the number of sheets printed with the decoloring toner to a total number of the number of sheets printed with the decoloring toner and the number of sheets printed with the normal toner, based on counts counted by said counting, and providing a notification for recommending printing using the decoloring toner to the logged-in user in a case where the decoloring toner use ratio is equal to or lower than a first threshold value.

According to the present invention, it is possible to promote the use of the decoloring toner printing.

Further features of the present invention will become apparent from the following description of exemplary embodiments (with reference to the attached drawings).

BRIEF DESCRIPTION OF THE DRAWINGS

FIG. 3 is a diagram useful in explaining a variety of data items managed by a counter DB in the first embodiment.

FIG. 6 is a diagram useful in explaining a variety of data items managed by the counter DB in the second embodiment.

FIG. 9 is a diagram useful in explaining a variety of data items managed by the counter DB in the third embodiment.

FIG. 12 is a diagram useful in explaining a variety of data items managed by the counter DB in the fourth embodiment.

DESCRIPTION OF THE EMBODIMENTS

The present invention will now be described in detail below with reference to the accompanying drawings showing embodiments thereof.

Figure 1:
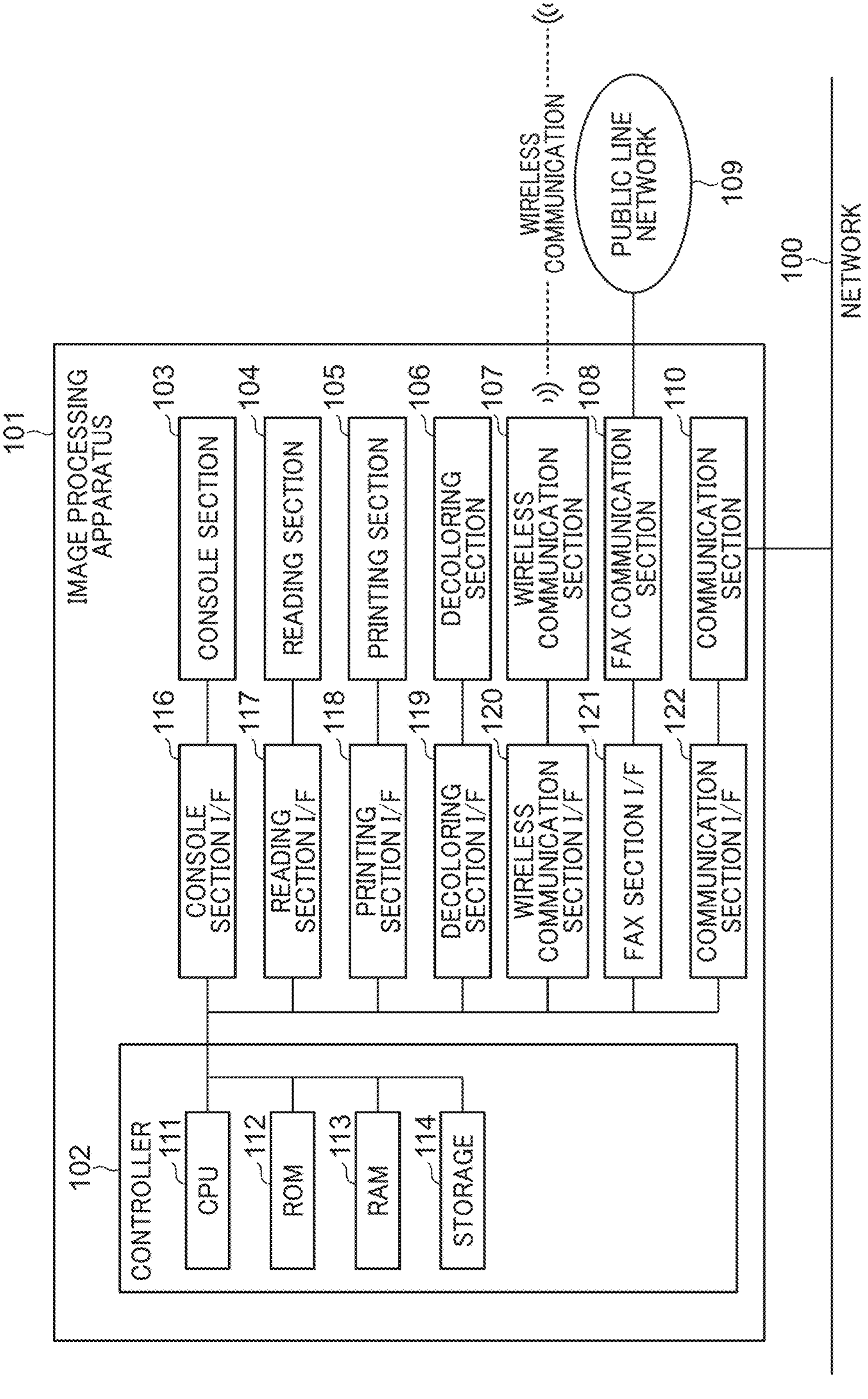
FIG. 1 is a block diagram of an image processing apparatus according to embodiments.

FIG. 1 is a block diagram of an image processing apparatus 101 according to embodiments. The image processing apparatus 101 includes a controller 102, a console section 103, a reading section 104, a printing section 105, a decoloring section 106, a wireless communication section 107, a Fax communication section 108, and a communication section 110. Further, the image processing apparatus 101 includes a console section interface (I/F) 116, a reading section I/F 117, a printing section I/F 118, a decoloring section I/F 119, a wireless communication section I/F 120, a Fax section I/F 121, and a communication section I/F 122. The controller 102 includes a central processing unit (CPU) 111, a read only memory (ROM) 112, a random access memory (RAM) 113, and a storage 114.

The controller 102 controls the overall operation of the image processing apparatus 101. The CPU 111 loads a control program stored in the ROM 112 or the storage 114 into the RAM 113 to perform a variety of controls, such as reading control and printing control. The ROM 112 stores a boot program and control programs, which can be executed by the CPU 111, a variety of parameters necessary for execution of the control programs, font data, and so forth. The RAM 113 is a main storage memory and has a work area for having loaded therein control programs stored in the ROM 112 and the storage 114 and a temporary storage area for temporarily storing e.g. a calculation result. The storage 114 stores image data, print data, a variety of programs, and a variety of setting information items. Although as the storage 114, a flash memory is used in the present embodiment, this is not limitative, but a solid state drive (SSD), a hard disk drive (HDD), an embedded Muti Media Card (eMMC), or the like can be used.

Note that although in the image processing apparatus 101, the CPU 111 performs a variety of image processing operations, this is not limitative, but the image processing apparatus 101 can be equipped with a graphics processing unit (GPU) dedicated to image processing, and this makes it possible to reduce the processing load of the CPU 111 and further speed up the processing.

In the image processing apparatus 101, the CPU 111 as a single CPU executes processes, described hereinafter, with reference to figures, using one memory (RAM 113). However, the configuration of the image processing apparatus 101 is not limited to this, but the image processing apparatus 101 can be configured such that the processes, described hereinafter, with reference to figures can be executed by causing a plurality of CPUs, RAMs, ROMs, and storages to cooperate. Further, part of the processes can be executed by using a hardware circuit, such as an application-specific integrated circuit (ASIC) or a field-programmable gate array (FPGA).

The console section 103 includes a display device 103A (see FIG. 4) equipped with a touch panel, hard keys, and so forth, displays information to a user, and receives an input from a user. The console section I/F 116 is an interface that connects between the controller 102 and the console section 103.

The reading section 104 is, specifically, a scanner, and optically reads an original. An image read by the reading section 104 is converted to image data, such as binary data, by the CPU 111 and is then transmitted e.g. to an external apparatus or is printed on a recording sheet by the printing section 105. The reading section I/F 117 is an interface that connects between the reading section 104 and the controller 102.

The printing section 105 forms an image on a recording sheet fed from a sheet feed cassette, i.e. prints, based on image data transferred thereto. Note that the CPU 111 transfers image data (print data) stored in the RAM 113 to the printing section 105 via the printing section I/F 118. The printing section I/F 118 is an interface that connects between the printing section 105 and the controller 102.

In the present embodiment, the printing section 105 is capable of executing printing with normal toner and printing with decoloring toner according to selection of a user. The decoloring toner is toner having characteristics that the tone is transparentized by heat applied thereto, and it is possible to decolor the decoloring toner printed on a recording sheet using the decoloring section 106 to thereby restore the recording sheet to a blank state. However, the decoloring toner is only required to be toner which is decolored by specific processing performed thereon, and is not limited to toner which is transparentized by heat application thereto. The normal toner refers to toner which cannot be decolored after being printed once.

The decoloring section 106 decolors (transparentizes) an image printed on a recording sheet with decoloring toner by applying heat to the recording sheet. With this decoloring processing, a reuse sheet, described hereinafter, is made. In a case where decoloring toner is used which is transparentized by using a method other than heating, the decoloring section 106 is configured to transparentize the decoloring toner by using a method suitable for characteristics of the decoloring toner. Note that although in the present embodiment, the image processing apparatus 101 includes the decoloring section 106, the decoloring section 106 can be provided as a separate body. The decoloring section I/F 119 is an interface that connects between the decoloring section 106 and the controller 102.

The wireless communication section 107 connects between a mobile terminal, such as a smartphone or a tablet PC, and the image processing apparatus 101. The wireless communication section I/F 120 is an interface that connects between the wireless communication section 107 and the controller 102, for control of wireless communication via the wireless communication section 107.

The Fax communication section 108 controls a modem or a network control unit (NCU) to thereby perform connection to a public line network 109 and control of a facsimile communication protocol and the like to thereby transmit and receive Fax data to and from an external apparatus (not shown) via the public line network 109. The Fax communication section I/F 121 is an interface that connects between the Fax communication section 108 and the controller 102 and controls the Fax communication section 108.

The communication section 110 transmits and receives a variety of information, such as image data, device information, and print data, to and from an external apparatus (not shown) connected to a network 100. As the method of transmitting and receiving a variety of information via the network 100, transmission and reception using an e-mail, and file transmission using a protocol, such as the file transfer protocol (FTP), the server message block (SMB), and the Web Distributed Authoring and Versioning (WEBDAV), can be used. The communication section I/F 122 is an interface that connects between the controller 102 and the network 100 and controls the communication section 110.

The above-described hardware configuration of the image processing apparatus 101 is common in the first to fourth embodiments, described hereinafter.

Figure 2:
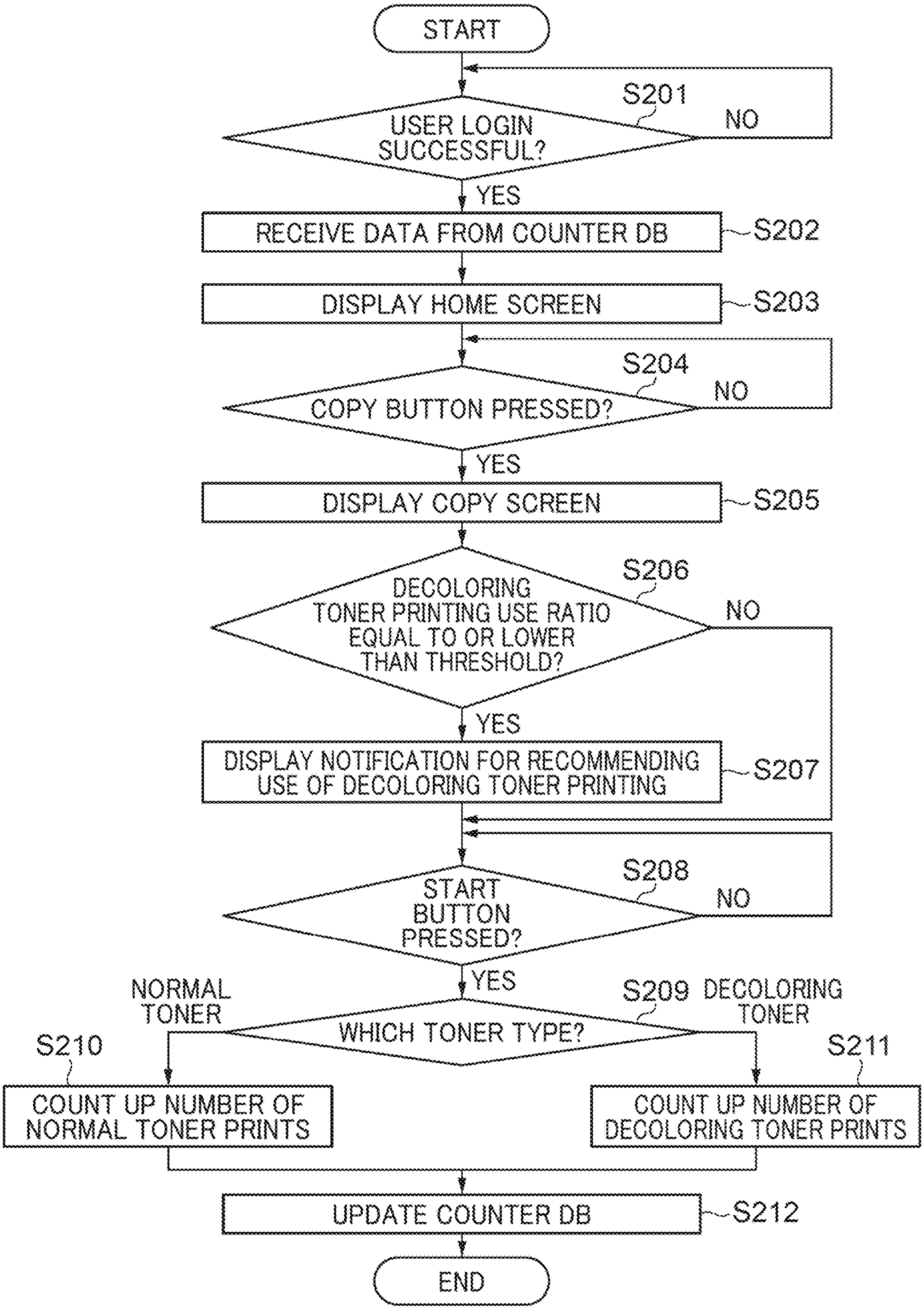
FIG. 2 is a flowchart of a copy process according to a first embodiment.

FIG. 2 is a flowchart of a copy process according to the first embodiment, which is performed by the image processing apparatus 101. Each processing (step) denoted by S number in this flowchart is realized by the CPU 111 of the controller 102, which performs centralized control of operations of the components of the image processing apparatus 101 by executing a predetermined program stored in the ROM 112 or the storage 114.

In a step S201, the controller 102 receives user login and determines whether or not the user login is successful. As the user login method, for example, when an ID card is held over a card reader, user information is read from the ID card, and in a case where the read user information indicates a user registered in advance, login is permitted. However, in the first embodiment, it is only necessary to uniquely identify user information, and the ID card reader is not necessarily required, but for example, a method using e.g. an input of a user ID and a password, fingerprint authentication, or iris authentication can be used. If it is determined that the user login is not successfully performed (NO to the step S201), the controller 102 executes the processing in the step S201 again, and if it is determined that the user login is successfully performed (YES to the step S201), the controller 102 proceeds to a step S202.

In the step S202, the controller 102 receives data from a counter database (counter DB). The counter DB is a database storing the number of sheets printed with normal toner, the number of sheets printed with decoloring toner, and the total number of prints, on a user basis, and details thereof will be described hereinafter.

Note that in the first embodiment, the counter DB is stored in the storage 114. However, this is not limitative, but the counter DB can be stored and managed in an external storage device (not shown), such as a cloud storage connected to the network 100. In this case, the controller 102 acquires the counter DB from the external storage device via the communication section 110 as required. In a case where the external storage device stores and manages the counter DB, the external storage device can manage not only the data of the image processing apparatus 101, but also data of a plurality of other image processing apparatuses.

As described above, the console section 103 has the display device 103A equipped with the touch panel. Then, in a step S203, the controller 102 displays a home screen on the display device 103A. Details of the home screen will be described hereinafter.

In a step S204, the controller 102 determines whether or not a copy button has been pressed. If it is determined that the copy button has been pressed (YES to the step S204), the controller 102 proceeds to a step S205, whereas if it is determined that the copy button has not been pressed (NO to the step S204), the controller 102 executes the processing in the step S204 again.

In the step S205, the controller 102 displays a copy screen on the display device 103A. The configuration of the copy screen will be described hereinafter.

In a step S206, the controller 102 determines whether or not the use ratio of decoloring toner printing is equal to or lower than a predetermined threshold value (hereinafter referred to as the "first threshold value") based on counts stored in the counter DB acquired in the step S202. The first threshold value used in the determination in the step S206 is a reference for determining the level of user's awareness of use of the decoloring toner printing. Note that it is possible to estimate that a user who frequently uses the decoloring toner printing has high awareness of use of the decoloring toner printing and is much interested in the decoloring toner printing at the same time. Therefore, in the first embodiment, a user who is not higher in the use ratio of the decoloring toner printing than the first threshold value is determined, for convenience's sake, to have low awareness of use of the decoloring toner printing. Inversely, a user who is higher in the use ratio of the decoloring toner printing than the first threshold value is determined, for convenience's sake, to have high awareness of use of the decoloring toner printing.

If it is determined that the use ratio of the decoloring toner printing is equal to or lower than the first threshold value (YES to the step S206), the controller 102 proceeds to a step S207, whereas if it is determined that the use ratio of the decoloring toner printing is higher than the first threshold value (NO to the step S206), the controller 102 proceeds to a step S208. The use ratio of the decoloring toner printing will be described hereinafter when the counter DB is described with reference to FIG. 3.

Note that the first threshold value has been set for the image processing apparatus 101 before executing the step S206. As the first threshold value, a value set by a manufacturer or administrator of the image processing apparatus 101 can be used, and the same value can be set for all users or a different value can be set on a user-by-user basis. Further, as the first threshold value, a value set by a user himself/herself, or e.g. a user average value can be dynamically calculated and used. Note that the user average value is an average value of the use ratio of the decoloring toner printing, calculated with respect to all users (users who can log into the image processing apparatus 101 in the step S201) each registered as a user of the image processing apparatus 101. Although in the first embodiment, the use ratio of the decoloring toner printing is calculated and compared with the first threshold value, a parameter other than the use ratio of the decoloring toner printing can be used insofar as the parameter makes it possible to estimate the awareness of use of the decoloring toner printing.

In the step S207, the controller 102 displays a notification for recommending use of the decoloring toner printing (first notification) on the display device 103A to thereby urge the logged-in user to be careful. Note that details of the notification for recommending use of the decoloring toner printing will be described hereinafter.

In the step S208, the controller 102 determines whether or not a copy start button has been pressed. If it is determined that the copy start button has not been pressed (NO to the step S208), the controller 102 executes the step S208 again, and if it is determined that the copy start button has been pressed (YES to the step S208), the controller 102 proceeds to a step S209.

In the step S209, the controller 102 determines a type of toner used for printing, based on the received copy instruction, and causes the processing to branch next according to a result of the determination. If it is determined that the normal toner has been selected, the controller 102 proceeds to a step S210, whereas if it is determined that the decoloring toner has been selected, the controller 102 proceeds to a step S211. Note that the logged-in user has performed toner selection processing on the decoloring toner printing use recommendation screen displayed on the display device 103A in the step S207, and therefore, the toner type can be determined in the step S209.

In the step S210, the controller 102 causes the reading section 104 and the printing section 105 to operate to thereby execute printing using the normal toner, and counts up the number of prints. In the step S211, the controller 102 causes the reading section 104 and the printing section 105 to operate to thereby execute printing using the decoloring toner, and counts up the number of prints. The respective counting-up operations in the step S210 and S211 are internally executed by the CPU 111.

In a step S212, the controller 102 updates the counter DB using a result obtained by the counting-up operation in the step S210 or S211, followed by terminating the present process.

FIG. 3 is a diagram showing an example of data managed by the counter DB in the first embodiment. In the first embodiment, a user ID 301, a normal toner prints number 302, a decoloring toner prints number 303, a total print number 304, and a decoloring toner printing use ratio 305 are managed by the counter DB.

The user ID 301 is information for identifying a user. In the first embodiment, the user ID 301 corresponds to the user ID of the user who has logged in the image processing apparatus 101 in the step S201 and is used to sort and record the counts counted in the step S210 and S211 on a user-by-user basis. Note that the counts can be recorded for each group including a plurality of users.

The normal toner prints number 302 is a count of recording sheets printed with the normal toner. The decoloring toner prints number 303 is a count of recording sheets printed with the decoloring toner. The total print number 304 is the total number of recording sheets printed by the printing section 105 regardless of whether the normal toner or the decoloring toner was used. The total print number 304 can be a sum (added value) of the normal toner prints number 302 and the decoloring toner prints number 303 or can be counted up and stored whenever printing is executed regardless of whether the normal toner or the decoloring toner is used. In the first embodiment, when the counter DB is updated in the step S212, the total print number 304 is updated using the sum of the normal toner prints number 302 and the decoloring toner prints number 303.

The decoloring toner printing use ratio 305 is a ratio of the number of recording sheets printed with the decoloring toner to the total print number 304 and is calculated by the formula of 100×the decoloring toner prints number 303÷the total print number 304 (%). Note that although in the first embodiment, the decoloring toner printing use ratio 305 is calculated, a value other than the decoloring toner printing use ratio 305 can be used insofar as it is possible to estimate user's awareness of use of the decoloring toner printing.

Figure 4A:
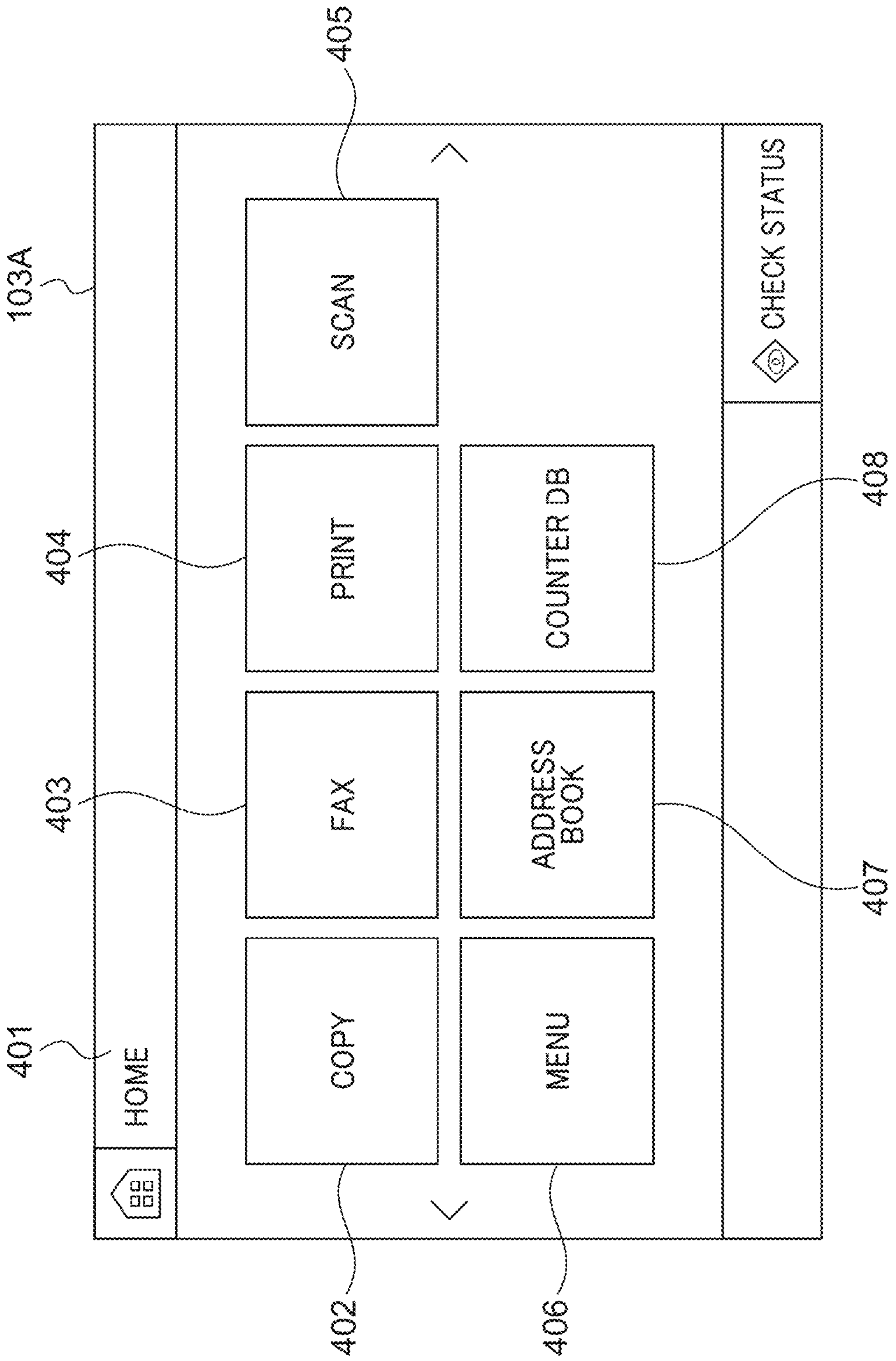
FIGS. 4A to 4D are diagrams showing an example of a variety of screens displayed on a display device in the first embodiment.

FIG. 4A is a diagram showing an example of a home screen 401 displayed on the display device 103A in the step S203. On the home screen 401, as operation objects for selecting a function of the image processing apparatus 101, buttons of copy 402, Fax 403, print 404, and scan 405 are displayed. Further, on the home screen 401, as operation objects associated with the settings of the image processing apparatus 101, buttons of menu 406, address book 407, and counter DB 408 are displayed.

Figure 4B:
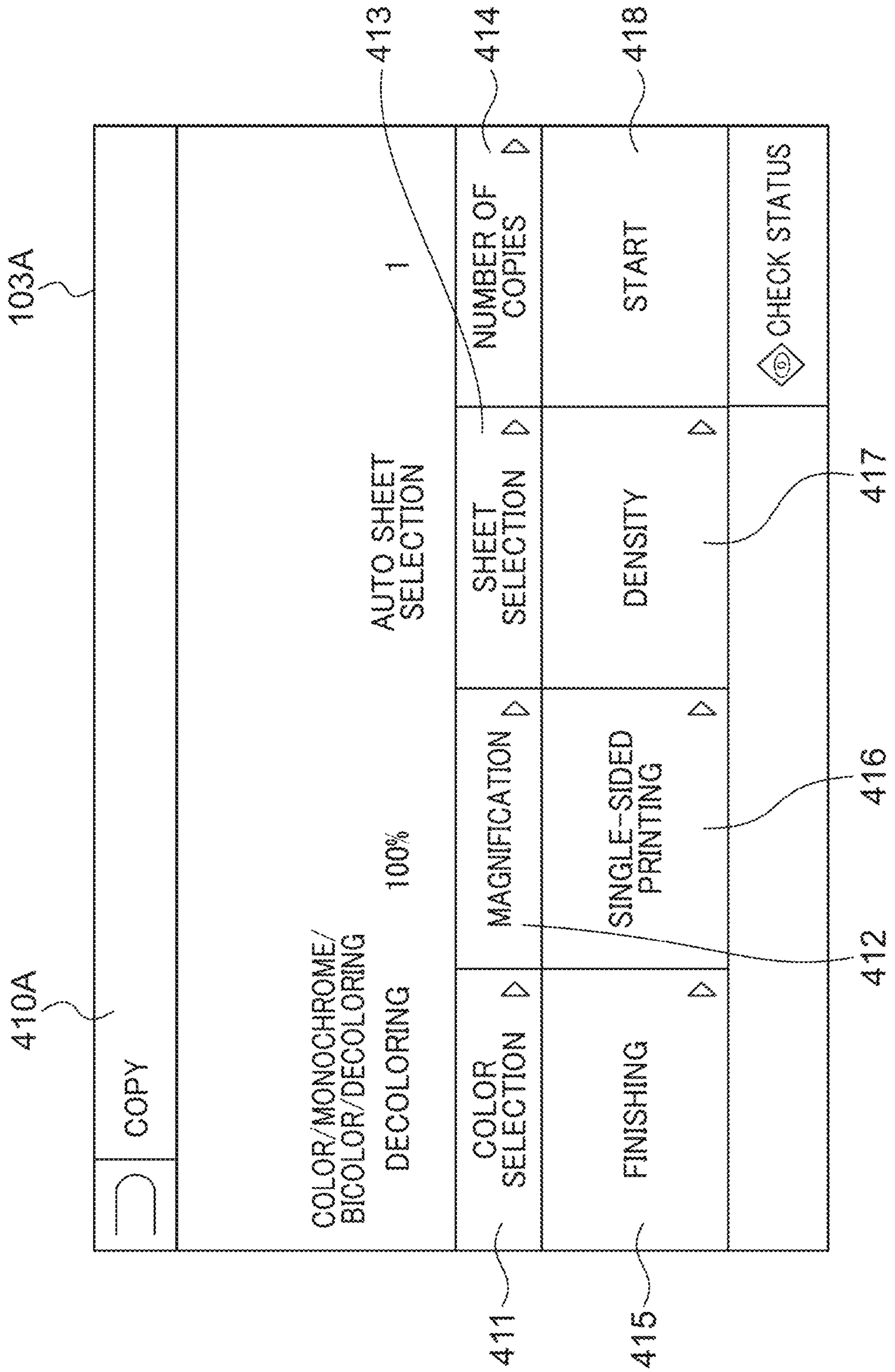

FIG. 4B is a diagram showing an example of the first copy screen, denoted by reference numeral 410A, which is displayed on the display device 103A in the step S205. On the first copy screen 410A, a color selection button 411, a magnification button 412, a sheet selection button 413, and a copies number 414 are displayed, and a current setting is also displayed for each button. Further, on the first copy screen 410A, as operation objects for setting print conditions, e.g. a finishing button 415, a printing-side button 416, and a density button 417 are displayed. When a start button 418 is pressed on the first copy screen 410A, copy processing is executed by operation of the reading section 104 and the printing section 105.

Figure 4C:
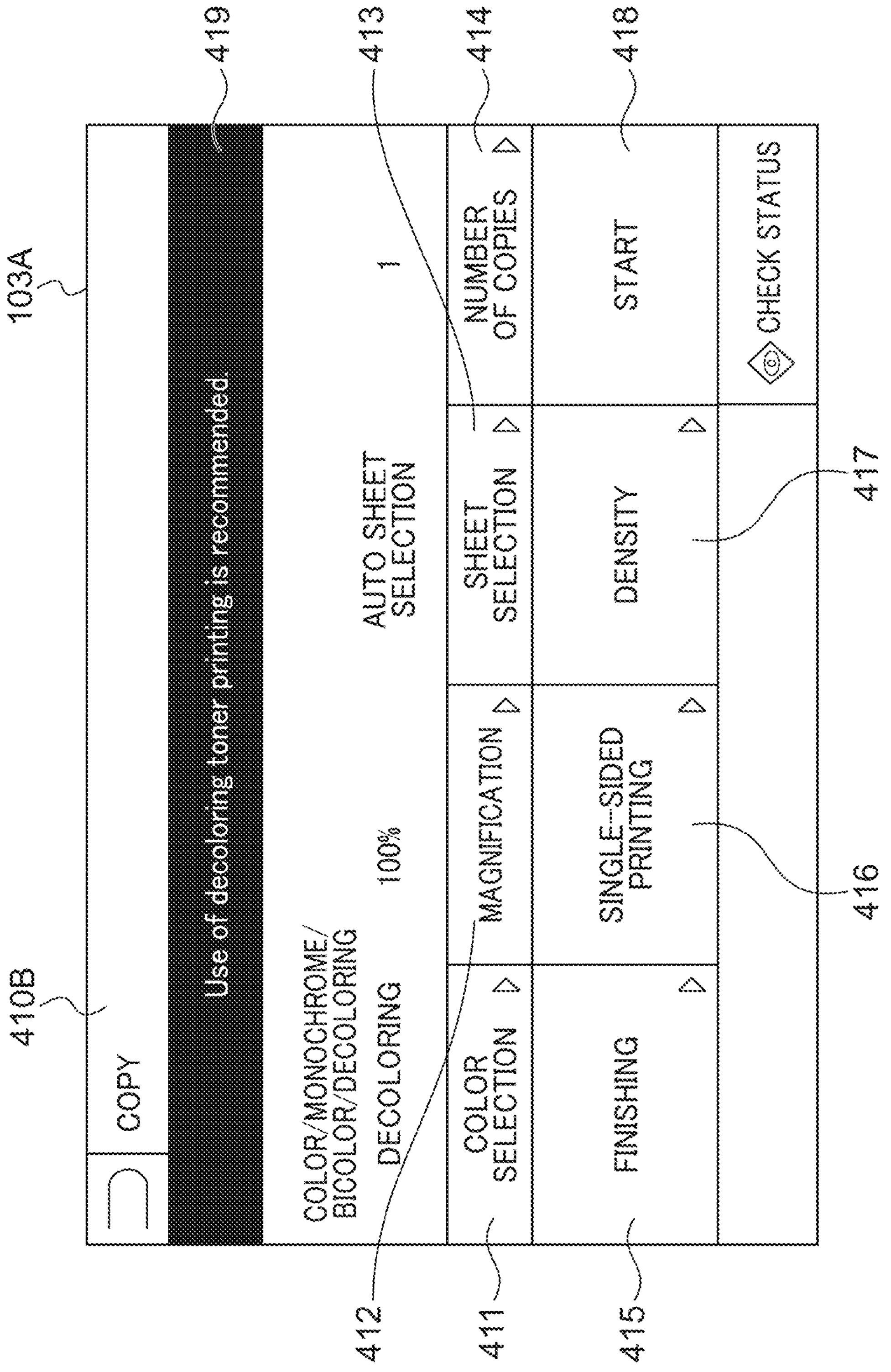

FIG. 4C is a diagram showing an example of a second copy screen 410B displayed on the display device 103A in the step S207. If it is determined in the step S206 that the use ratio of the decoloring toner printing is equal to or lower than the first threshold value, the first copy screen 410A is shifted in the step S207 to the second copy screen 410B on which the decoloring toner printing use recommendation notification, denoted by reference numeral 419, is displayed. The decoloring toner printing use recommendation notification 419 is displayed within the screen of the display device 103A e.g. as a popup display. Note that the color selection button 411 can be automatically set to the decoloring toner simultaneously when the decoloring toner printing use recommendation notification 419 is displayed.

Figure 4D:
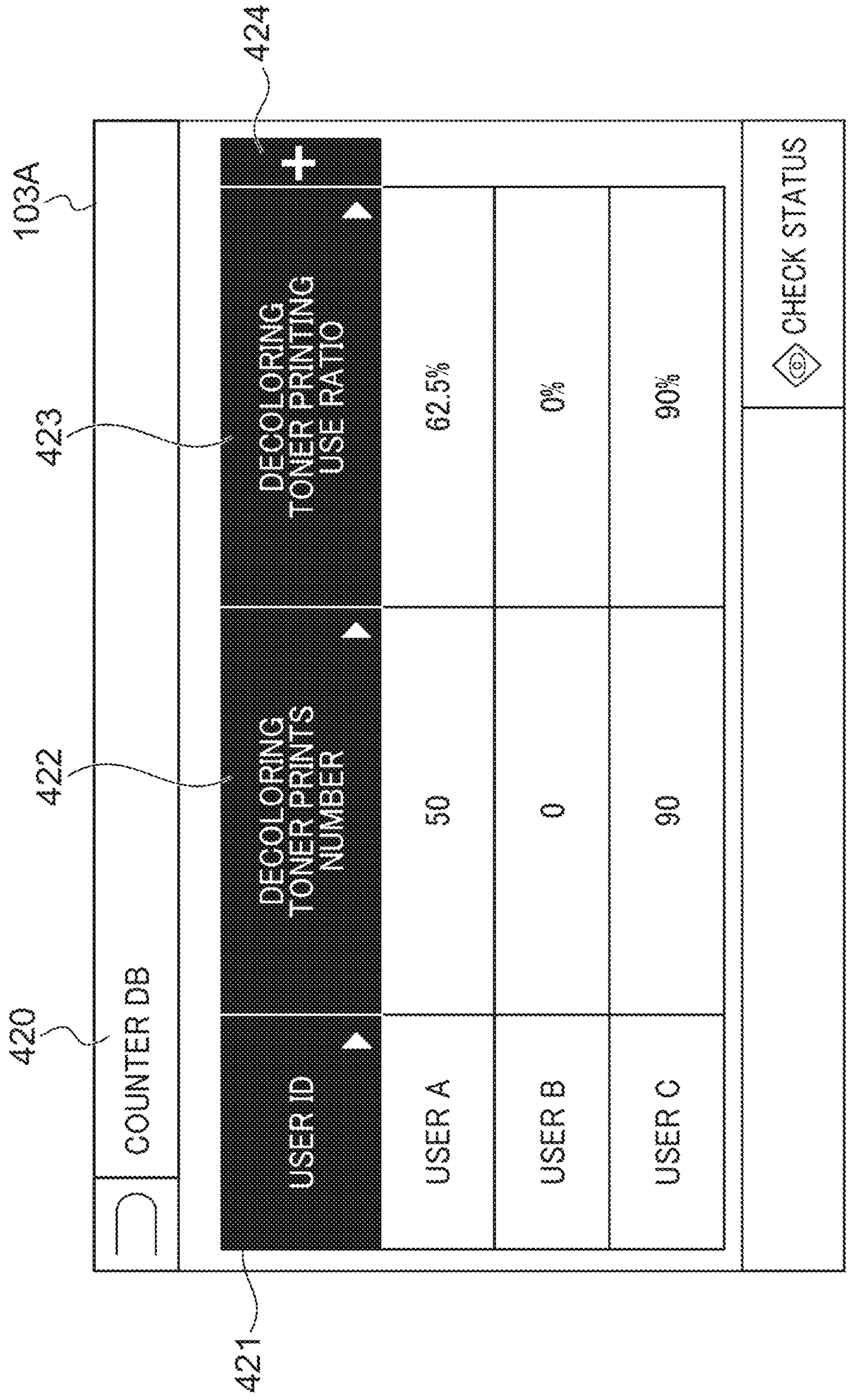

FIG. 4D is a diagram showing an example of a counter DB screen 420 displayed on the display device 103A. The counter DB screen 420 is displayed on the display device 103A when the button of the counter DB 408 is pressed on the home screen 401. Note that the operation of the button of the counter DB 408 can be permitted only to a user having a specific authority, such as an administrator of the image processing apparatus 101.

On the counter DB screen 420, a user ID confirmation button 421, a decoloring toner prints number confirmation button 422, a decoloring toner printing use ratio confirmation button 423, and a display item addition button 424 are displayed. The user ID confirmation button 421 is used to display the user ID 301 of each user managed by the counter DB. The decoloring toner prints number confirmation button 422 is used to display the decoloring toner prints number 303 of each user managed by the counter DB. The decoloring toner printing use ratio confirmation button 423 is used to display the decoloring toner printing use ratio 305 of each user managed by the counter DB.

The display items displayed on the counter DB screen 420 can be set by a user as desired. Although the three items are displayed in the present example, another item which is managed by the counter DB can be added and displayed by pressing the display item addition button 424. The user can sort the user IDs in an ascending/descending order, extract data which is not smaller/larger than a value input by the logged-in user, and change the form of display, including a non-display setting, by pressing each button displayed on the counter DB screen 420.

Note that in the present embodiment, the counter DB screen 420 is displayed on the display device 103A included in the console section 103. This is not limitative, but for example, the counter DB can be acquired from an external storage device communicably connected to the image processing apparatus 101, and the counter DB screen 420 can be similarly displayed on a display of an external information processing apparatus, such as a PC, which is communicably connected to the image processing apparatus 101. The counter DB can manage information not only of one image processing apparatus, but information collected from the counter DBs of a plurality of image processing apparatuses, for parallel display.

FIGS. 4A to 4C show the home screen 401, the first copy screen 410A, and the second copy screen 410B, by way of example, respectively. On the display device 103A, a screen associated with the print function and its settings, a print screen, and a scan screen can be displayed, as other display screens, and the decoloring toner printing use recommendation notification 419 can also be displayed on these screens. Note that the print screen and the scan screen refer to screens displayed on the display device 103A when the buttons of the print 404 and the scan 405 are pressed, respectively.

Although the description is given of the example that the first copy screen 410A is shifted to the second copy screen 410B in which the decoloring toner printing use recommendation notification 419 is displayed as the popup display on the screen, the decoloring toner printing use recommendation notification can be displayed on a dedicated screen (not shown). Further, the decoloring toner printing use recommendation notification 419 is displayed in a state not hiding the other display on the second copy screen 410B but can be largely displayed and hide the other display, and in this case, a button for deleting the decoloring toner printing use recommendation notification 419 is displayed together. Further, although, on the second copy screen 410B, the notification is displayed by using a sentence for recommending use of the decoloring toner printing, the notification can have more forcible contents that warn the logged-in user. In a case where such warning is thus performed, if the decoloring toner printing use ratio is lower than the first threshold value, control for limiting the normal toner printing can be performed. Thus, the notification to the logged-in user can be freely configured within a range not deviated from the purpose of raising the awareness of use and interest of a logged-in user with respect to the decoloring toner printing.

As described above, according to the first embodiment, the decoloring toner printing use recommendation notification is given to a logged-in user whose decoloring toner printing use ratio is equal to or lower than the first threshold value. With this, it is possible to raise the awareness of use and interest of a logged-in user whose decoloring toner printing use ratio is equal to or lower than the first threshold value with respect to the decoloring toner printing, and promote the use of the decoloring toner printing. As a result, it is possible to save resources by promoting recycling of recording sheets printed with the decoloring toner.

Note that in the above-described embodiment, the method of displaying the decoloring toner printing use recommendation notification on the display device 103A is used in the step S207. This is not limitative, but a method of outputting a use recommendation message to a logged-in user using voice by providing a speaker (not shown) in the image processing apparatus 101 can be used. Further, both of the display on the display device 103A and the notification using voice can be used in combination.

Incidentally, as the method of updating the counter DB, there can be mentioned, for example, a method of updating the counter DB by storing all data after user registration or a method of updating the counter DB by storing data of recent several years (such as two years) or several months (such as six months). Here, for example, let us consider a case where the decoloring toner use ratio in all data after user registration is used in the step S206. Assuming that the user used the normal toner printing for a while after user registration, this results in a situation in which the decoloring toner printing use ratio has a small value even though the user recently uses the decoloring toner printing. In this case, even though the logged-in user recently uses the decoloring toner printing, the user receives the notification provided in the step S207, and it is expected that the user feels that the notification does not make sense. To prevent this, the data acquired from the counter DB in the step S202 can be limited to e.g. data of last one month, and with this, it is possible to provide a notification giving consideration to a user who has raised the decoloring toner printing use ratio.

Next, a second embodiment will be described. The second embodiment is based on a configuration in which the use of a reuse sheet is further recommended to a user who has a high awareness of use of the decoloring toner printing. Specifically, the number of prints is separately counted with respect to new sheets and reuse sheets, which are used for execution of the decoloring toner printing, and in a case where the count satisfies a predetermined condition, a notification is provided to the user. The reuse sheet refers to a sheet which was subjected to decoloring of the decoloring toner used for printing thereon, once or more.

Figure 5:
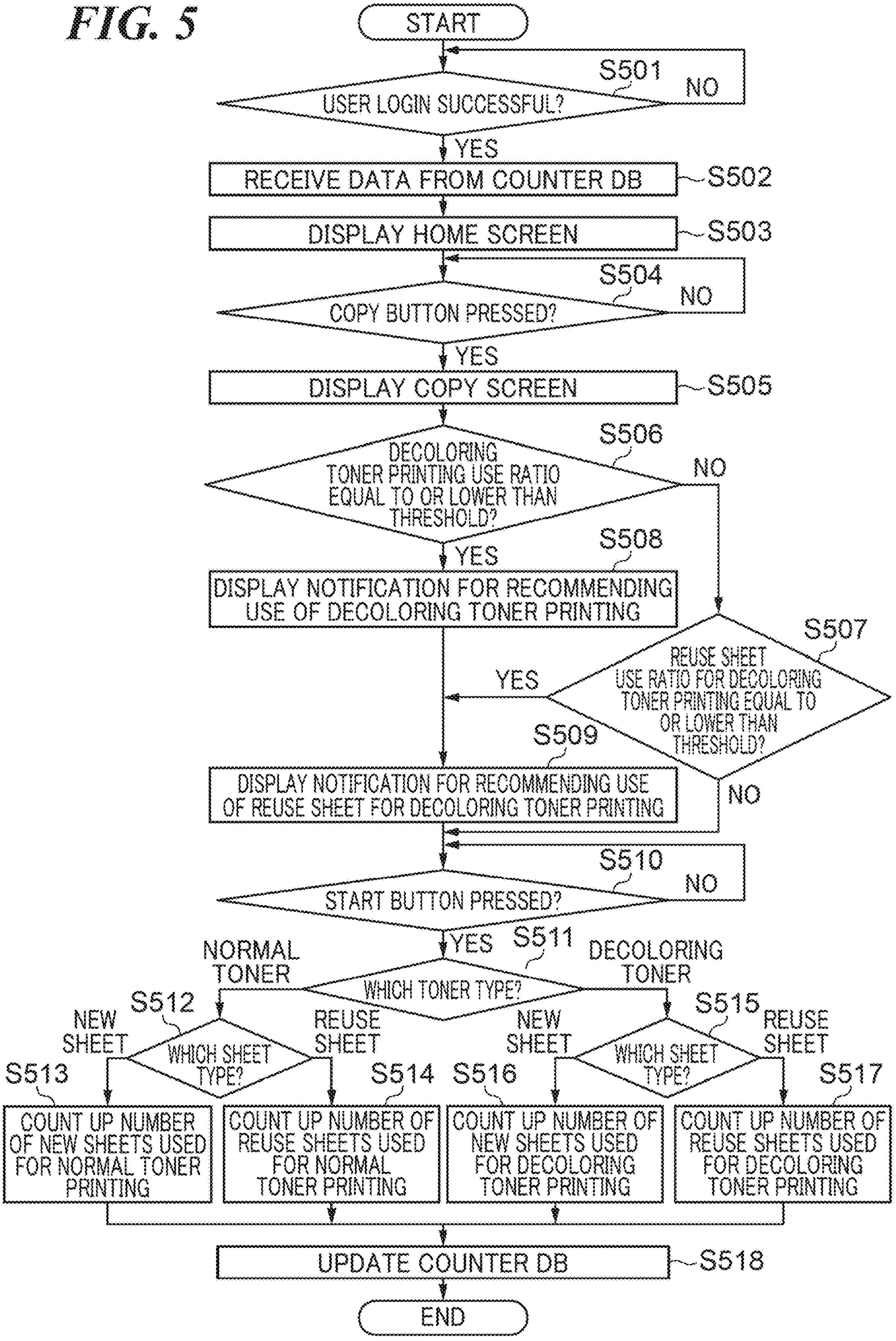
FIG. 5 is a flowchart of a copy process according to a second embodiment.

FIG. 5 is a flowchart of a copy process according to the second embodiment, which is performed by the image processing apparatus 101. Each processing (step) denoted by S number in this flowchart is realized by the CPU 111 of the controller 102, which performs centralized control of operations of the components of the image processing apparatus 101 by executing a predetermined program stored in the ROM 112 or the storage 114.

Processing operations in a step S501 to a step S506 are the same as the processing operations in the step S201 to the step S206 of the copy process in FIG. 2, and hence description thereof is omitted. If it is determined in the step S506 that the use ratio of the decoloring toner printing is higher than the first threshold value (NO to the step S506), the controller 102 proceeds to a step S507, whereas if it is determined that the use ratio of the decoloring toner printing is equal to or lower than the first threshold value (YES to the step S506), the controller 102 proceeds to a step S508.

In the step S507, the controller 102 determines whether or not the use ratio of the reuse sheet for the decoloring toner printing is equal to or lower than a predetermined threshold value (hereinafter referred to as the "second threshold value). If it is determined that the use ratio of the reuse sheet is equal to or lower than the second threshold value (YES to the step S507), the controller 102 proceeds to a step S509, whereas if it is determined that the use ratio of the reuse sheet is higher than the second threshold value (NO to the step S507), the controller 102 proceeds to a step S510.

Processing in the step S508 is the same as the processing in the step S207 of the copy process in FIG. 2, and hence description thereof is omitted. After execution of the step S508, the controller 102 proceeds to the step S509, wherein the controller 102 provides a notification for recommending use of a reuse sheet for the decoloring toner printing (second notification). Note that details of the notification for recommending use of a reuse sheet for the decoloring toner printing, in the step S509, will be described in detail hereinafter.

Processing operations in the step S510 and a step S511 are the same as the processing operations in the step S208 and the step S209 of the copy process in FIG. 2, and hence description thereof is omitted. If it is determined in the step S511 that the normal toner has been selected, the controller 102 proceeds to a step S512.

In the step S512, the controller 102 determines a sheet type to be used for printing, based on a received copy instruction, and causes the processing to branch next according to a result of the determination If it is determined that the sheet type is a new sheet, the controller 102 proceeds to a step S513, whereas if it is determined that the sheet type is a reuse sheet, the controller 102 proceeds to a step S514.

In the step S513, the controller 102 performs the normal toner printing and counts up the number of new sheets used for printing. On the other hand, in the step S514, the controller 102 performs the normal toner printing and counts up the number of reuse sheets used for printing. Note that as the sheet determination method, the sheet can be determined, for example, based on whether or not a specific mark is printed on the sheet, or based on a used sheet feed cassette by making available sheet feed cassettes exclusively used for new sheets and a sheet feed cassette exclusively used for reuse sheets. After execution of the step S513 or S514, the controller 102 proceeds to a step S518.

If it is determined in the step S511 that the decoloring toner printing has been selected, the controller 102 proceeds to a step S515. Processing in the step S515 is the same as the processing in the step S512, and hence description thereof is omitted. If it is determined in the step S515 that the sheet type is a new sheet, the controller 102 proceeds to a step S516, whereas if it is determined that the sheet type is a reuse sheet, the controller 102 proceeds to a step S517.

In the step S516, the controller 102 performs the decoloring toner printing and counts up the number of new sheets used for printing. On the other hand, in the step S517, the controller 102 performs the decoloring toner printing and counts up the number of reuse sheets used for printing. After execution of the step S516 or S517, the controller 102 proceeds to the step S518. In the step S518, the controller 102 updates the counter DB using the respective counts obtained in the step S513, S514, S516, and S517, followed by terminating the present process.

FIG. 6 is a diagram showing an example of data managed by the counter DB in the second embodiment. The counter DB manages the user ID 301, a used new sheets number 601 and a used reuse sheets number 602 in the normal toner printing, and the normal toner prints number 302 as the sum of these sheets numbers. Further, the counter DB manages a used new sheets number 603 and a used reuse sheets number 604 in the decoloring toner printing, and the decoloring toner prints number 303 as the sum of these sheets numbers. Further, the counter DB manages a printed new sheets total number 605, a printed reuse sheets total number 606, the total print number 304 of all types of sheets, and a reuse sheet use ratio 607 in the decoloring toner printing. Note that the same ones of these management items as the items managed by the counter DB shown in FIG. 3 are denoted by the same reference numerals, and description thereof is omitted.

The used new sheets number 601 in the normal toner printing is a cumulative value of the count counted in the step S513, and the used reuse sheets number 602 in the normal toner printing is a cumulative value of the count counted in the step S514. The used new sheets number 603 in the decoloring toner printing is a cumulative value of the count counted in the step S516, and the used reuse sheets number 604 in the decoloring toner printing is a cumulative value of the count counted in the step S517. The printed new sheets total number 605 is the total number of new sheets used for printing regardless of the type of used toner and is expressed by the sum of the used new sheets number 601 and the used new sheets number 603. The total used reuse sheets number 606 is a total number of reuse sheets used for printing regardless of the type of used toner and is expressed by the sum of the used reuse sheets number 602 and the used reuse sheets number 604. The reuse sheet use ratio 607 in the decoloring toner printing is a ratio of the used reuse sheets number 604 in the decoloring toner printing to the decoloring toner prints number 303 and can be calculated by the formula of 100×the used reuse sheets number 604÷the decoloring toner prints number 303.

Figure 7A:
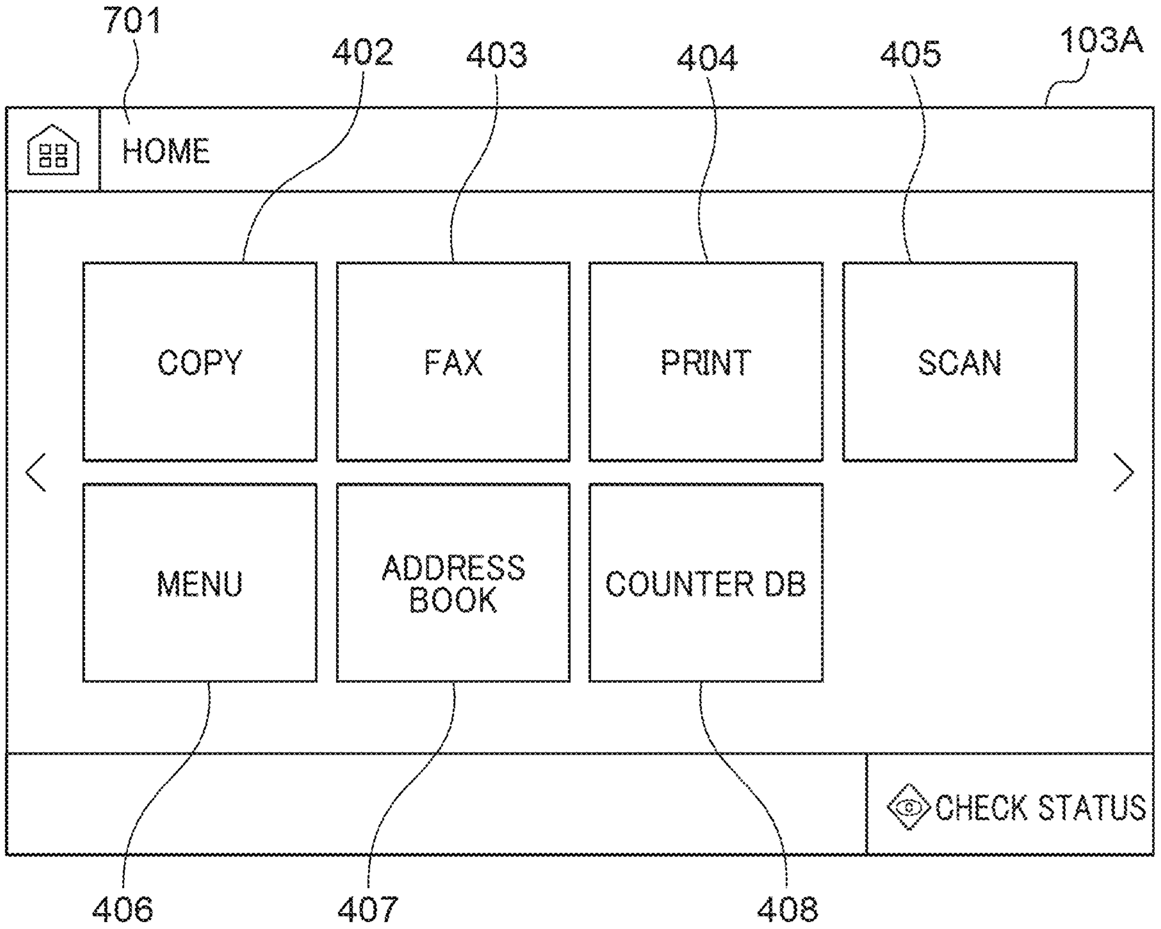
FIGS. 7A to 7E are diagrams showing an example of a variety of screens displayed on the display device in the second embodiment.
Figure 7B:
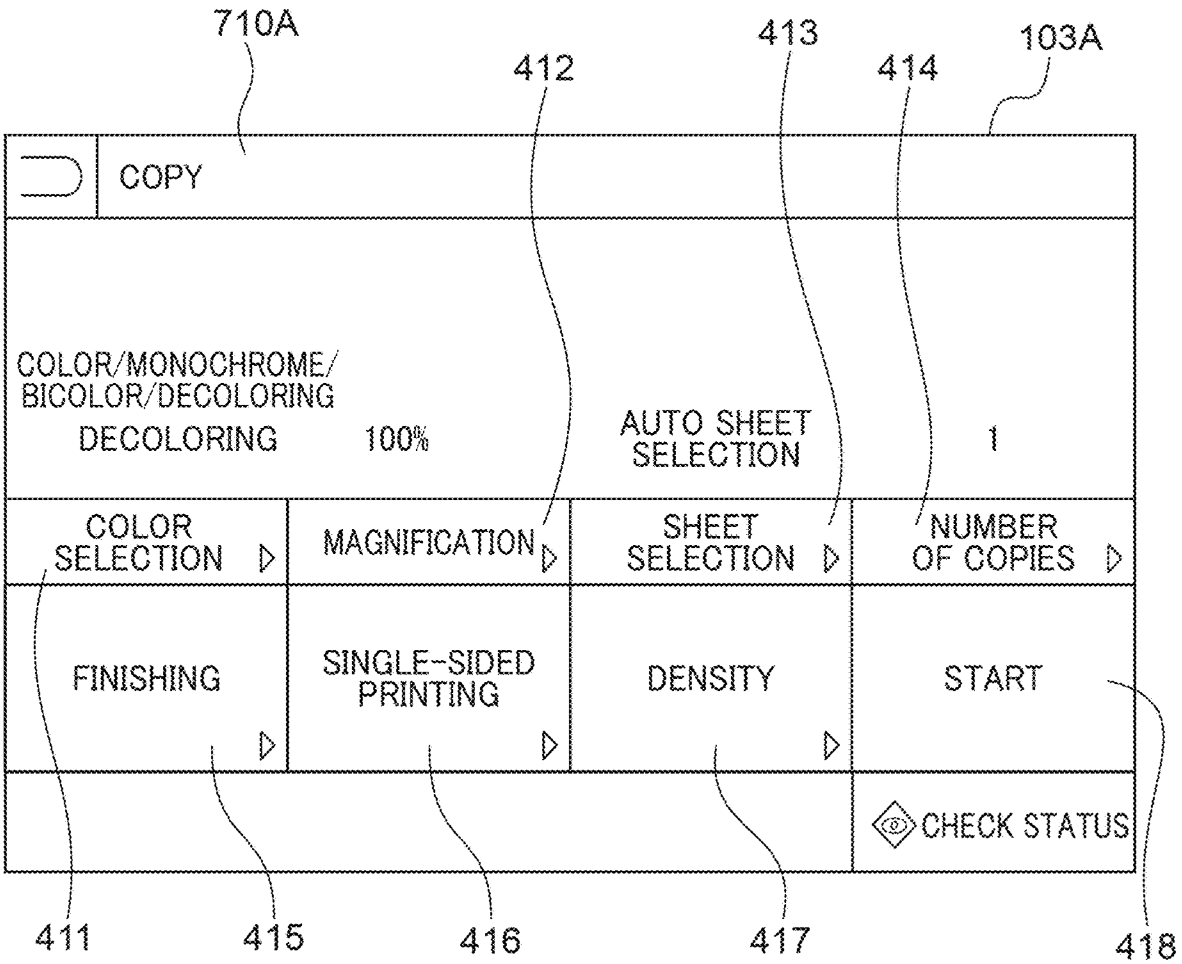

FIG. 7A is a diagram showing an example of a home screen 701 displayed on the display device 103A in the step S503. The home screen 701 is the same as the home screen 401 shown in FIG. 4A, and hence description thereof is omitted. Further, FIG. 7B is a diagram showing an example of a first copy screen 710A displayed on the display device 103A in the step S505. The first copy screen 710 is the same as the first copy screen 410A shown in FIG. 4B, and hence description thereof is omitted.

Figure 7C:
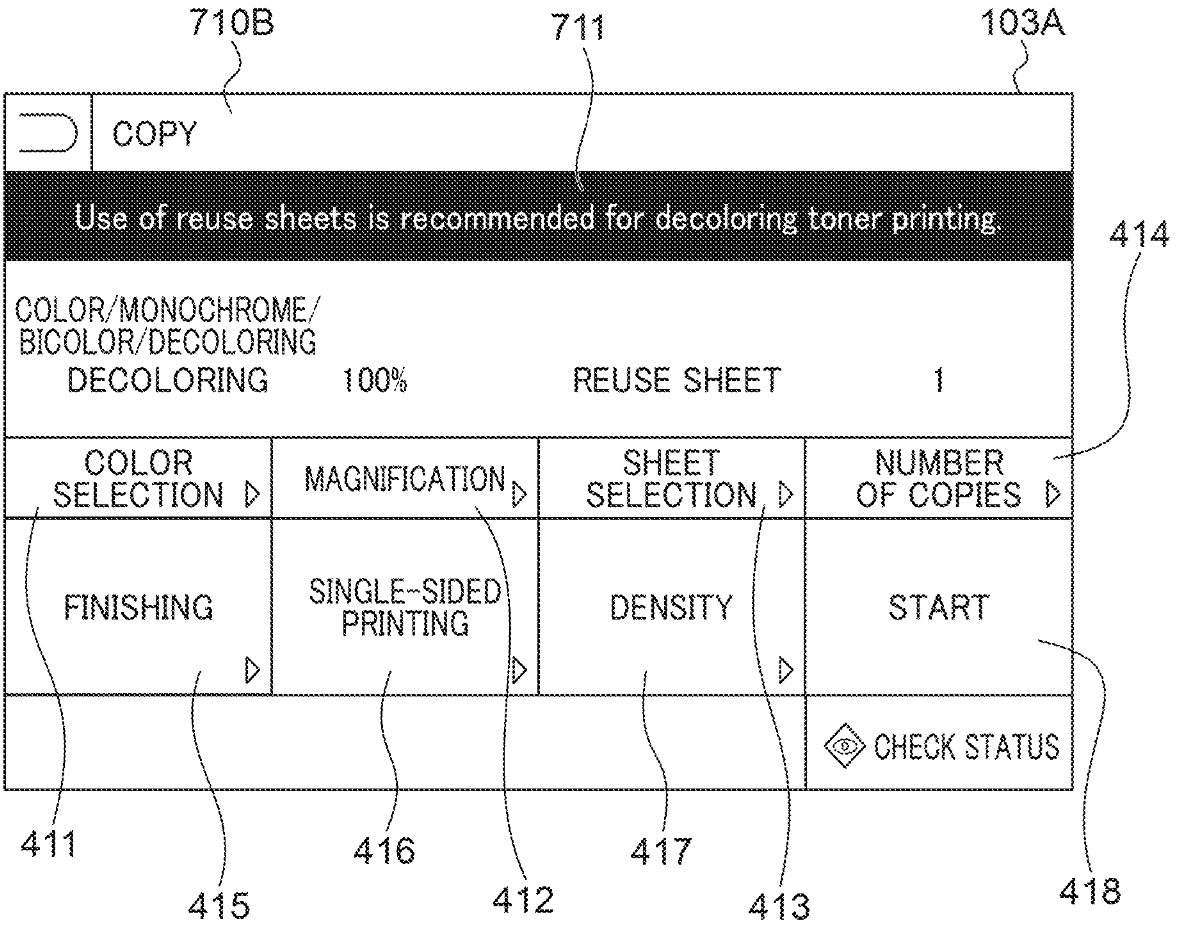

FIG. 7C is a diagram showing an example of a second copy screen 710B displayed on the display device 103A in the step S509. The second copy screen 710B is an example of the screen displayed in a case where the processing in the step S509 is executed after the process proceeds from the step S506 to the step S509 via the step S507 (in other words, the step S508 is not executed). If it is determined in the step S507 that the reuse sheet use ratio in the decoloring toner printing is equal to or lower than the second threshold value, a reuse sheet use recommendation notification 711 is displayed as the popup display as shown in the second copy screen 710B. Note that the configuration can be such that in combination with display of the reuse sheet use recommendation notification 711, the sheet selection button 413 is automatically set to the reuse sheet, i.e. the recording sheet to be used for a print job executed by a logged-in user is automatically set to the reuse sheet.

The other configuration of the second copy screen 710B is the same as the second copy screen 410B shown in FIG. 4C, and hence description thereof is omitted. Note that the notification in the step S509 can be performed using voice or performed using both of the display and the voice, similarly to the notification in the step S207 in the first embodiment.

Figure 7D:
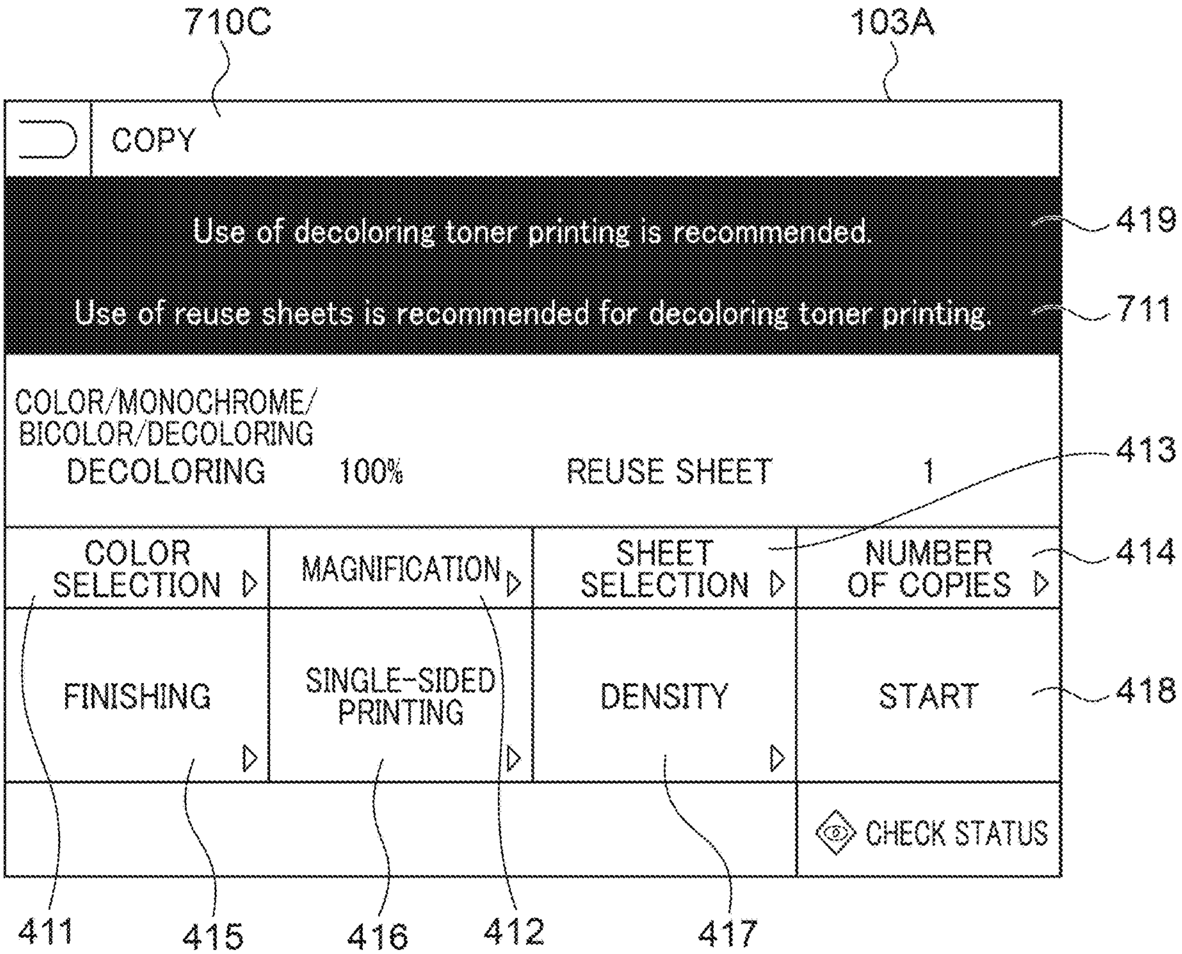

FIG. 7D is a diagram showing an example of a third copy screen 710C displayed on the display device 103A in the step S509. The third copy screen 710C is an example of the screen displayed in a case where the processing in the step S509 is executed after the process proceeds from the step S506 to the step S509 via the step S508 (in other words, the step S507 is not executed).

Although not shown, in the step S508, the same copy screen as the second copy screen 410B shown in FIG. 4C is displayed on the display device 103A. In a case where the step S509 is executed after execution of the step S508, the reuse sheet use recommendation notification 711 is displayed as the popup display without deleting the decoloring toner printing use recommendation notification 419 displayed on the display device 103A by executing the step S508. Note that the other configuration of the third copy screen 710C is the same as the second copy screen 410B shown in FIG. 4C, and hence description thereof is omitted.

Figure 7E:
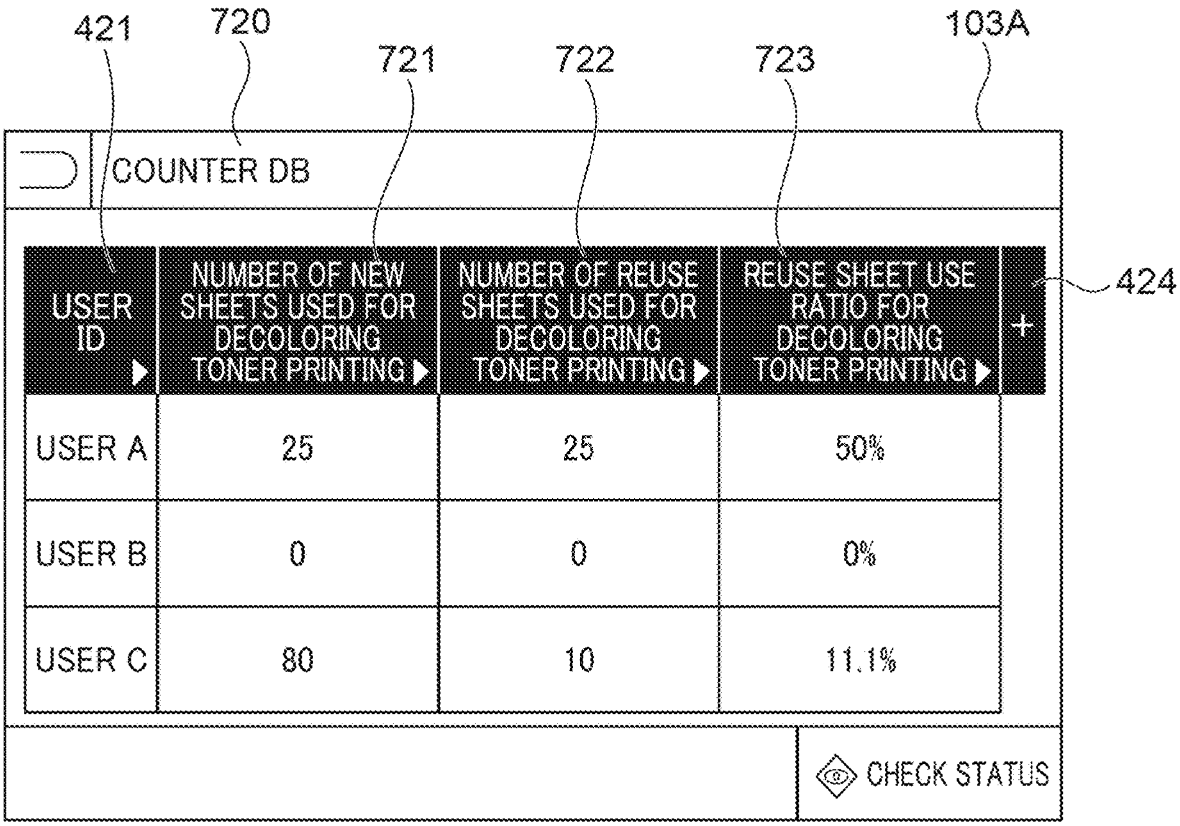

FIG. 7E is a diagram showing an example of a counter DB screen 720 displayed on the display device 103A. Note that the same ones of the items displayed on the counter DB screen 720 as those displayed on the counter DB screen 420 shown in FIG. 4D are denoted by the same reference numerals, and description thereof is omitted. Further, the display authority of the counter DB screen 720 can also be set in the same fashion as the display authority of the counter DB screen 420.

The counter DB manages the number of used new sheets, the number of used reuse sheets, and the reuse sheet use ratio, in the decoloring toner printing. A used new sheets number confirmation button 721 in the decoloring toner printing displays the used new sheets number 603 of new sheets used for the decoloring toner printing. A used reuse sheets number confirmation button 722 in the decoloring toner printing displays the used reuse sheets number 604 of reuse sheets used for the decoloring toner printing. A reuse sheet use ratio confirmation button 723 in the decoloring toner printing displays the reuse sheet use ratio 607 in the decoloring toner printing.

Note that, similar to the counter DB screen 420, on the counter DB screen 720 as well, when the display item addition button 424 is pressed, it is possible to add and display other items managed by the counter DB. Further, it is possible to sort the user IDs in an ascending/descending order, extract data which is not smaller/larger than a value input by the user, and change the form of display, including a non-display setting. Further, handling of the counter DB in a case where the counter DB is stored in an external storage device is also the same as described in the first embodiment.

As described above, similar to the first embodiment, according to the second embodiment, it is possible to raise the awareness of use and interest of a logged-in user, who is low in the use ratio of the decoloring toner printing, with respect to the decoloring toner printing, and promote the use of the decoloring toner printing. Further, in the second embodiment, by providing a reuse sheet use recommendation notification, it is possible to promote the use of reuse sheets and raise the awareness of use of reused sheets. With this, the effect of improving a situation where a logged-in user continues using new sheets is expected.

Next, a third embodiment will be described. The third embodiment is based on a configuration in which even in a use environment where an upper limit of the number of prints is set on a user-by-user basis, in a case where the decoloring toner printing is executed, the remaining number of sheets which can be used for printing (hereinafter referred to as the "remaining printable sheets number) is not updated so as to prevent the remaining printable sheets number from being reduced.

Figure 8:
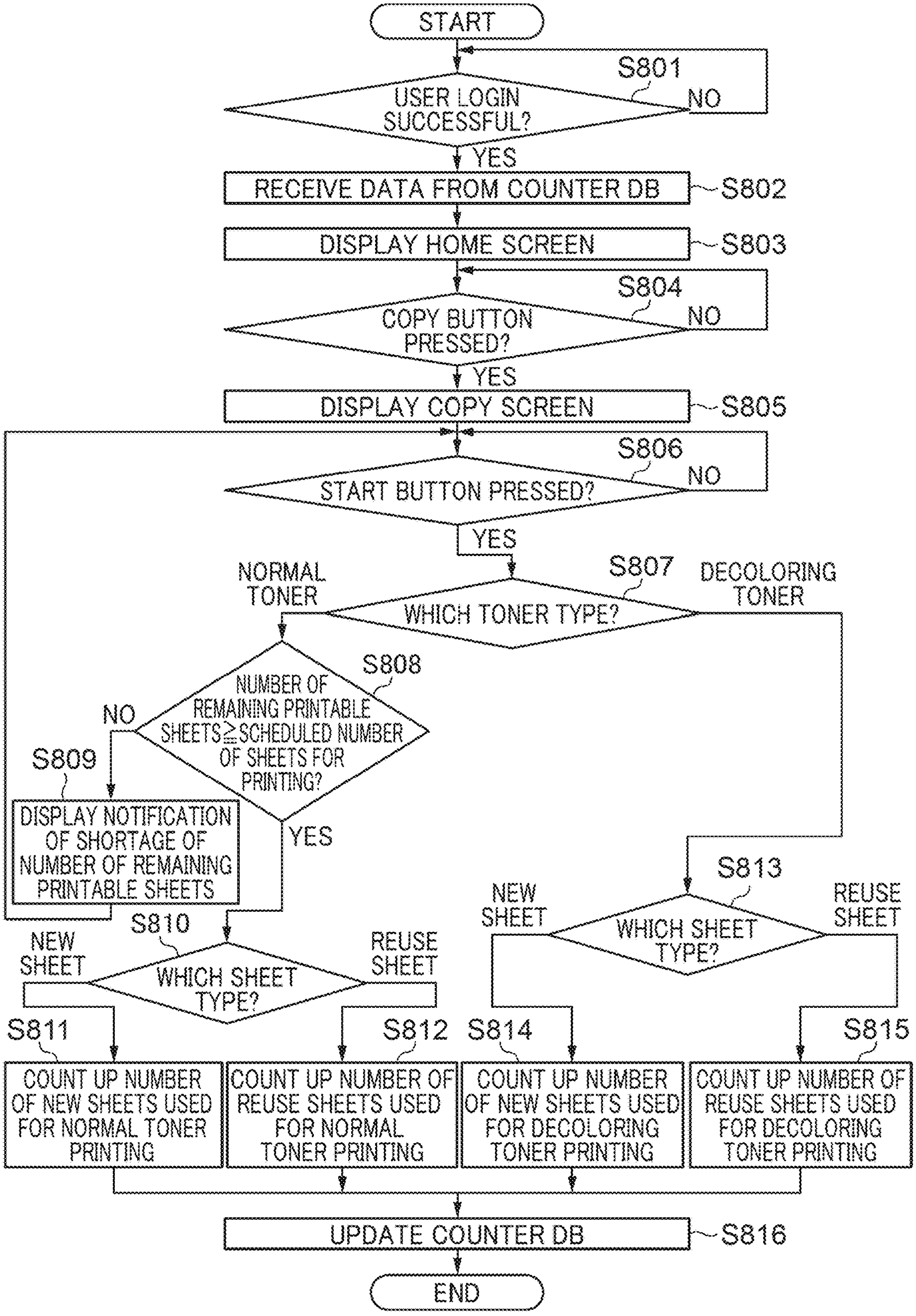
FIG. 8 is a flowchart of a copy process according to a third embodiment.

FIG. 8 is a flowchart of a copy process according to the third embodiment, which is performed by the image processing apparatus 101. Each processing (step) denoted by S number in this flowchart is realized by the CPU 111 of the controller 102, which performs centralized control of operations of the components of the image processing apparatus 101 by executing a predetermined program stored in the ROM 112 or the storage 114.

Processing operations in a step S801 to a step S807 are the same as the processing operations in the step S201 to the step S205, the step S208, and the step S209 of the copy process in FIG. 2, and hence description thereof is omitted. If it is determined in the step S807 that the normal toner has been selected, the controller 102 proceeds to a step S808.

In the step S808, the controller 102 determines whether or not the remaining printable sheets number is equal to or larger than the scheduled number of sheets for printing. If it is determined that the remaining printable sheets number is smaller than the scheduled number of sheets for printing (NO to the step S808), the controller 102 proceeds to a step S809.

In the step S809, the controller 102 displays a notification that the remaining printable sheets number is insufficient (hereinafter referred to as the "sheet shortage notification") on the display device 103A and then proceeds to the step S806. Note that in the step S809, a notification that printing is possible by setting the decoloring toner printing can be displayed (notified) together.

If it is determined in the step S808 that the remaining printable sheets number is equal to or larger than the scheduled number of sheets for printing (YES to the step S808), the controller 102 proceeds to a step S810. Further, if it is determined in the step S807 that the decoloring toner printing has been selected, the controller 102 proceeds to a step S813. Processing operations in the step S810, a step S811, a step S812, the step S813, and a step S814 to a step S816 are the same as the processing operations in the step S512 to S518 of the flowchart in FIG. 5, and hence description thereof is omitted.

FIG. 9 is a diagram showing an example of data managed by the counter DB in the third embodiment. Note that the same ones of the items managed by the counter DB in the third embodiment as the items managed by the counter DBs in the first and second embodiments (see FIGS. 3 and 6) are denoted by the same reference numerals, and description thereof is omitted.

In the third embodiment, an upper limit of a printable sheets number 901 and a remaining printable sheets number 902 are further managed by the counter DB. The upper limit of the printable sheets number 901 is an upper limit value of the number of recording sheets which can be printed (permitted e.g. by an administrator for printing) in a job, such as a copy/print/Fax, and is set on a user-by-user basis. The remaining printable sheets number 902 is the number calculated by subtracting the normal toner prints number 302, which is the total number of prints by the executed normal toner printing, from the upper limit of the printable sheets number 901 and is calculated and stored in the counter DB when the counter DB is updated in the step S816.

Figure 10A:
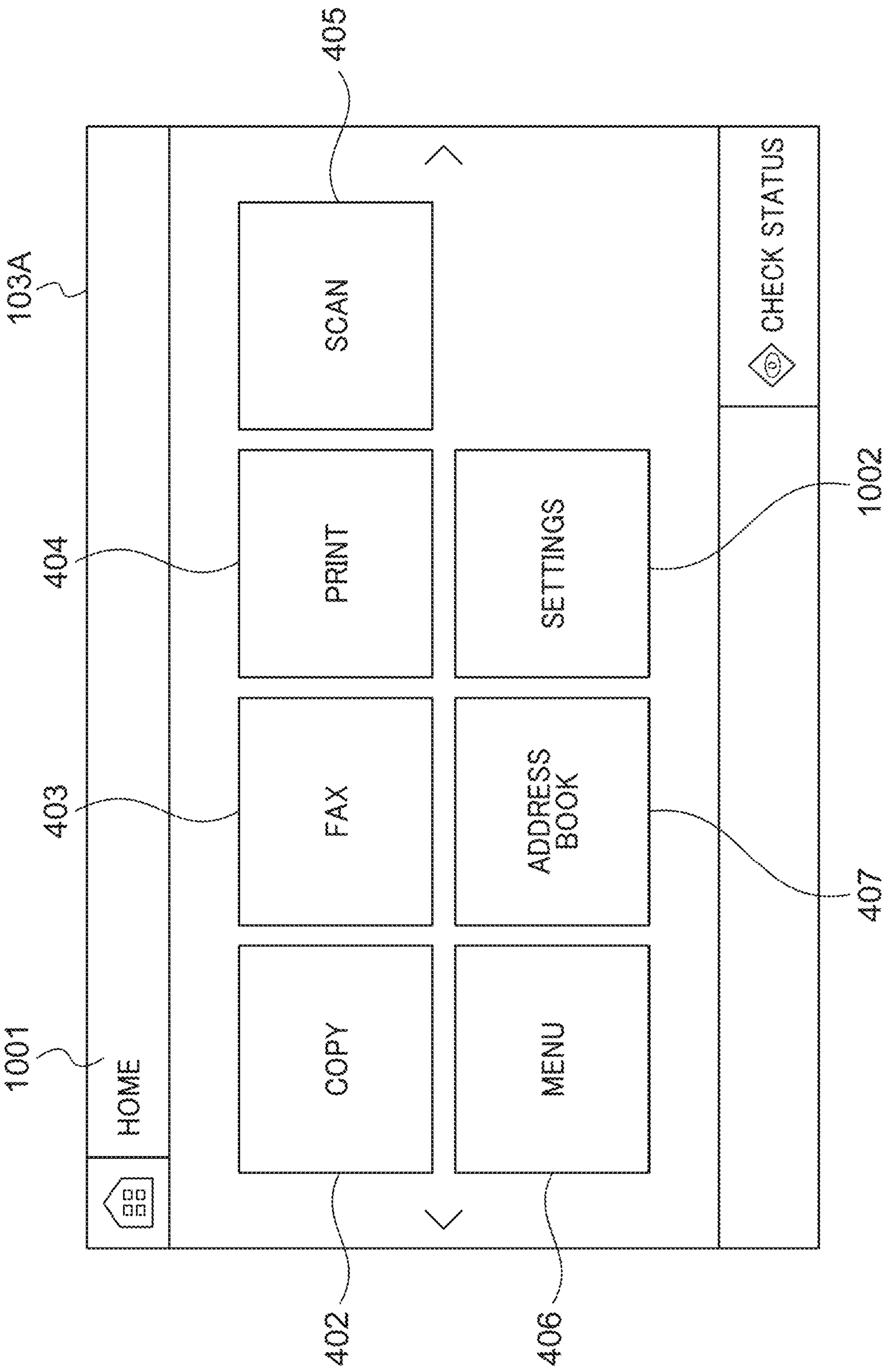
FIGS. 10A to 10D are diagrams showing an example of a variety of screens displayed on the display device in the third embodiment.
Figure 10B:
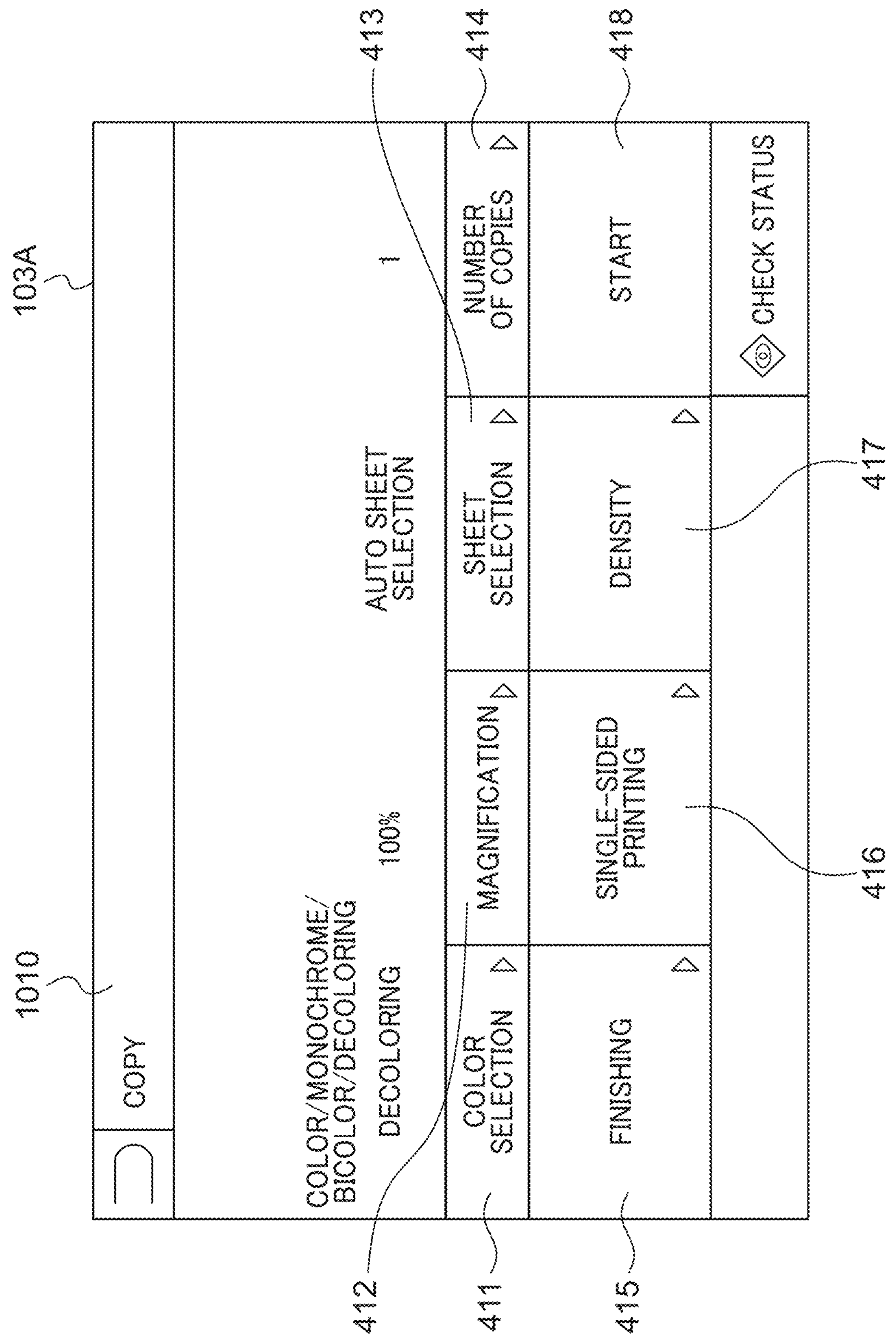

FIG. 10A is a diagram showing an example of a home screen 1001 displayed on the display device 103A in the step S803. The home screen 1001 is different from the home screen 401 shown in FIG. 4A only in that the button of the counter DB 408 is replaced by a button of settings 1002, and hence description of the same elements is omitted. FIG. 10B is a diagram showing an example of a copy screen 1010 displayed on the display device 103A in the step S805. The copy screen 1010 is the same as the first copy screen 410A shown in FIG. 4B, and hence description thereof is omitted.

Figure 10C:
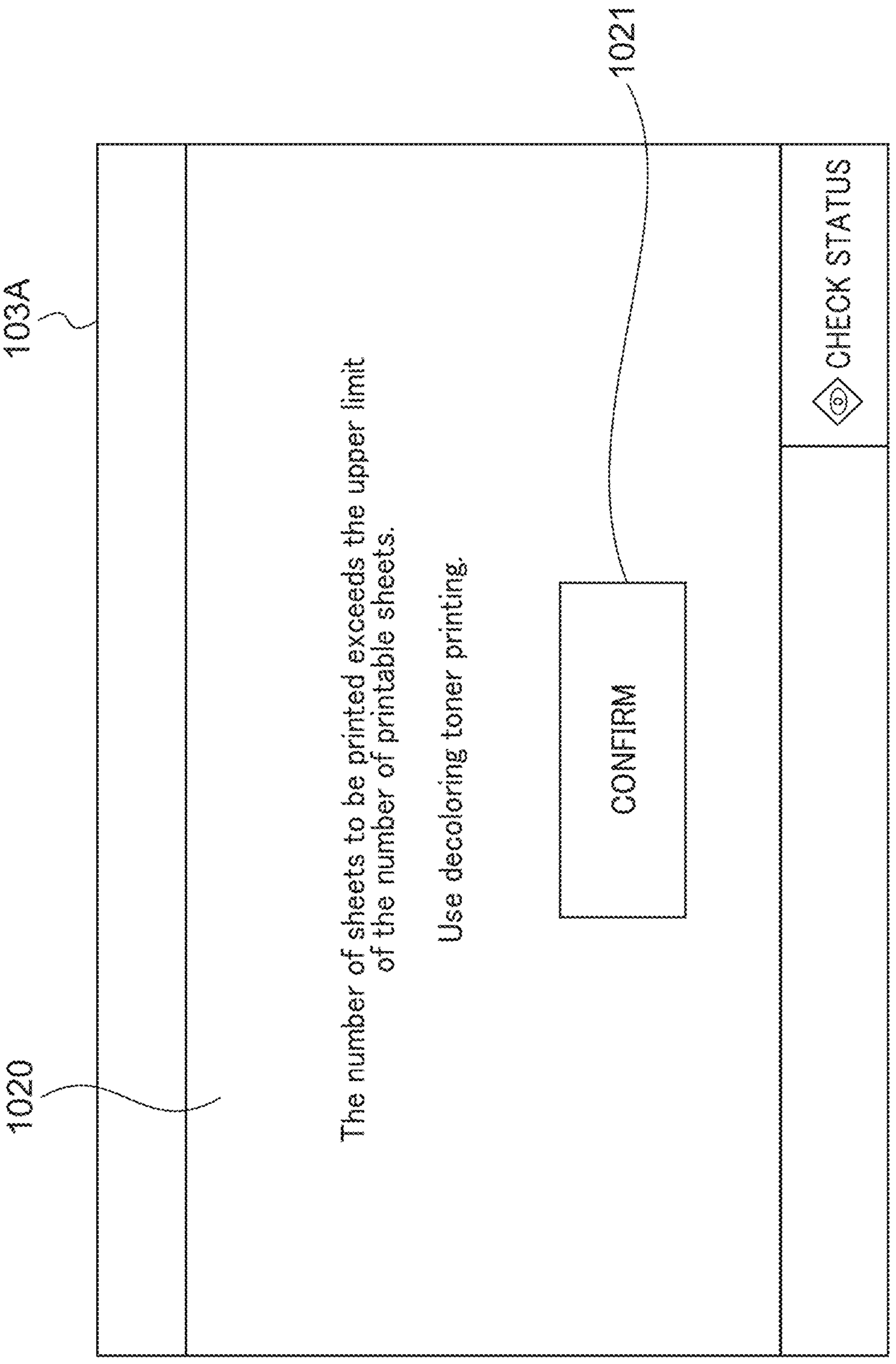

FIG. 10C is a diagram showing an example of a remaining printable sheets number shortage notification screen 1020 displayed on the display device 103A. The remaining printable sheets number shortage notification screen 1020 is displayed on the display device 103A in the step S809 in a case where it is determined in the step S808 that the remaining printable sheets number is smaller than the scheduled number of sheets for printing. When the logged-in user presses a confirmation button 1021 in remaining printable sheets number shortage notification screen 1020, the screen display is shifted to the copy screen 1010. At this time, the setting of the color selection button 411 can be automatically changed to the decoloring toner.

Figure 10D:
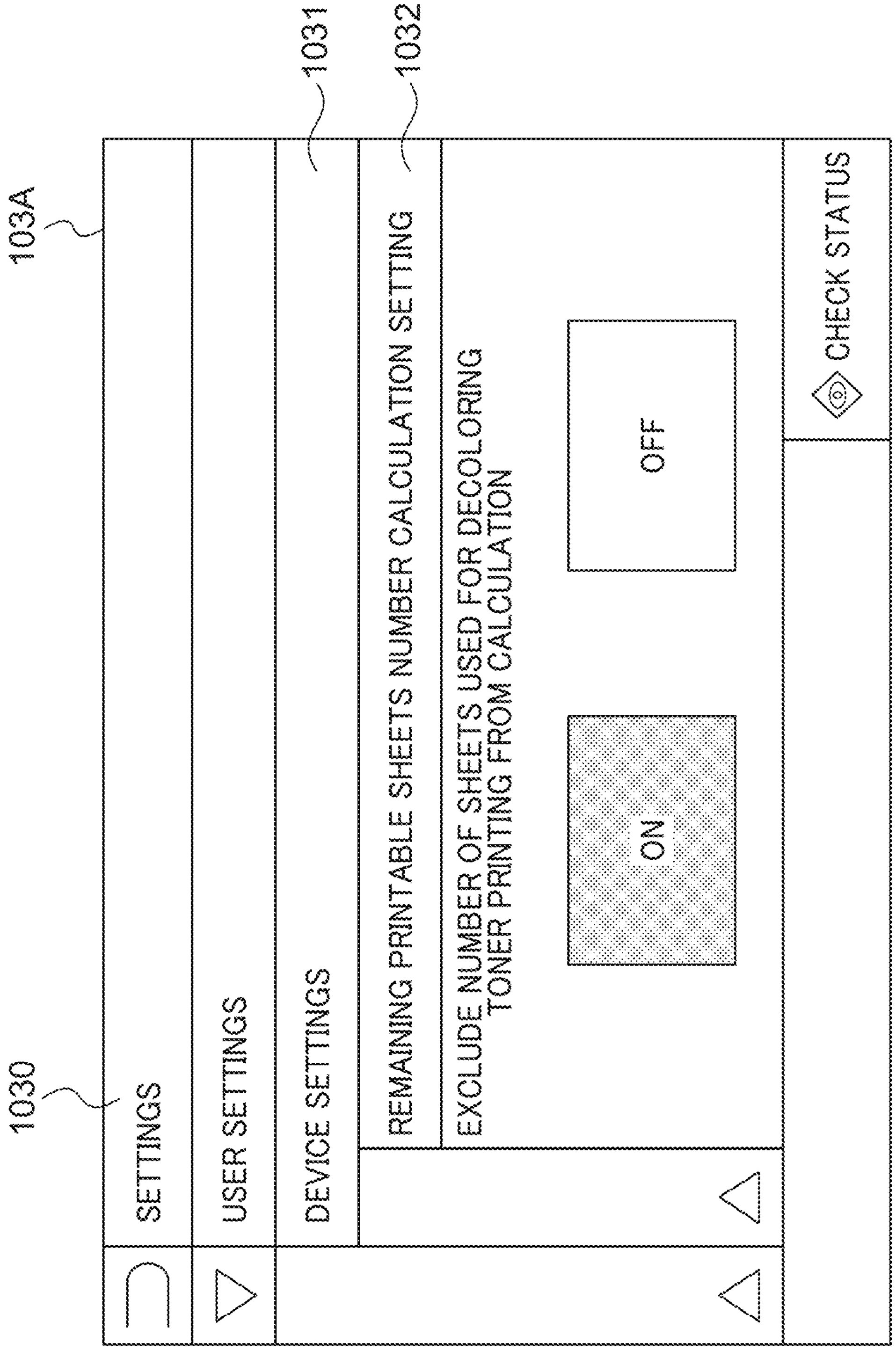

FIG. 10D is a diagram showing an example of a setting screen 1030 displayed on the display device 103A in a case where the button of the settings 1002 is pressed on the home screen 1001. The setting screen 1030 has a device setting button 1031 and a remaining printable sheets number calculation setting button 1032. The device setting button 1031 is an operation object for displaying the overall settings of the image processing apparatus 101. The remaining printable sheets number calculation setting button 1032 is an operation object for selecting, as one of the setting items, whether or not to exclude the number of sheets used for the decoloring toner printing when calculating the remaining printable sheets number. In FIG. 10D, the remaining printable sheets number calculation setting button 1032 is in a state set to "ON", which indicates a setting that the number of sheets used for the decoloring toner printing is excluded. Note that the setting screen 1030 can be configured such that only a user having a specific authority, such as the administrator of the image processing apparatus 101, is permitted to display the same or set a setting thereon.

As described above, according to the third embodiment, the remaining printable sheets number is not reduced in a case where printing is performed with the decoloring toner, and hence a user who has high awareness of use of the decoloring toner printing can receive preferential treatment that the user can perform printing on sheets the number of which exceeds the upper limit of the number of prints. Further, if a user who has low awareness of use of the decoloring toner printing knows that the user can receive preferential treatment concerning the upper limit of the number of prints in a case where the user uses the decoloring toner printing, it is expected to raise the awareness of use and interest of the user with respect to the decoloring toner printing and increase the use frequency of the decoloring toner printing. Thus, it is possible to promote the use of the decoloring toner printing for all users.

Note that in the third embodiment, in a case where the decoloring toner printing is performed, the remaining printable sheets number is not reduced. However, this is not limitative, but a configuration can be employed in which the remaining printable sheets number is not reduced only in a case where the decoloring toner printing is performed using reuse sheets. The remaining printable sheets number 902 in this case can be calculated by subtracting the normal toner prints number 302 and the used new sheets number 603 in the decoloring toner printing from the upper limit of the printable sheets number 901. Further, although the setting of the upper limit of the printable sheets number 901 and the calculation of the remaining printable sheets number 902 are performed on an individual user basis in the counter DB shown in FIG. 9, this is not limitative, but the above-mentioned setting and calculation can be performed on a group basis, i.e. for each of groups (such as sections of a company or organizations) each consisting of a plurality of users.

Next, a fourth embodiment will be described. The fourth embodiment is based on a configuration in which scoring is performed based on a variety of counting results.

Figure 11:
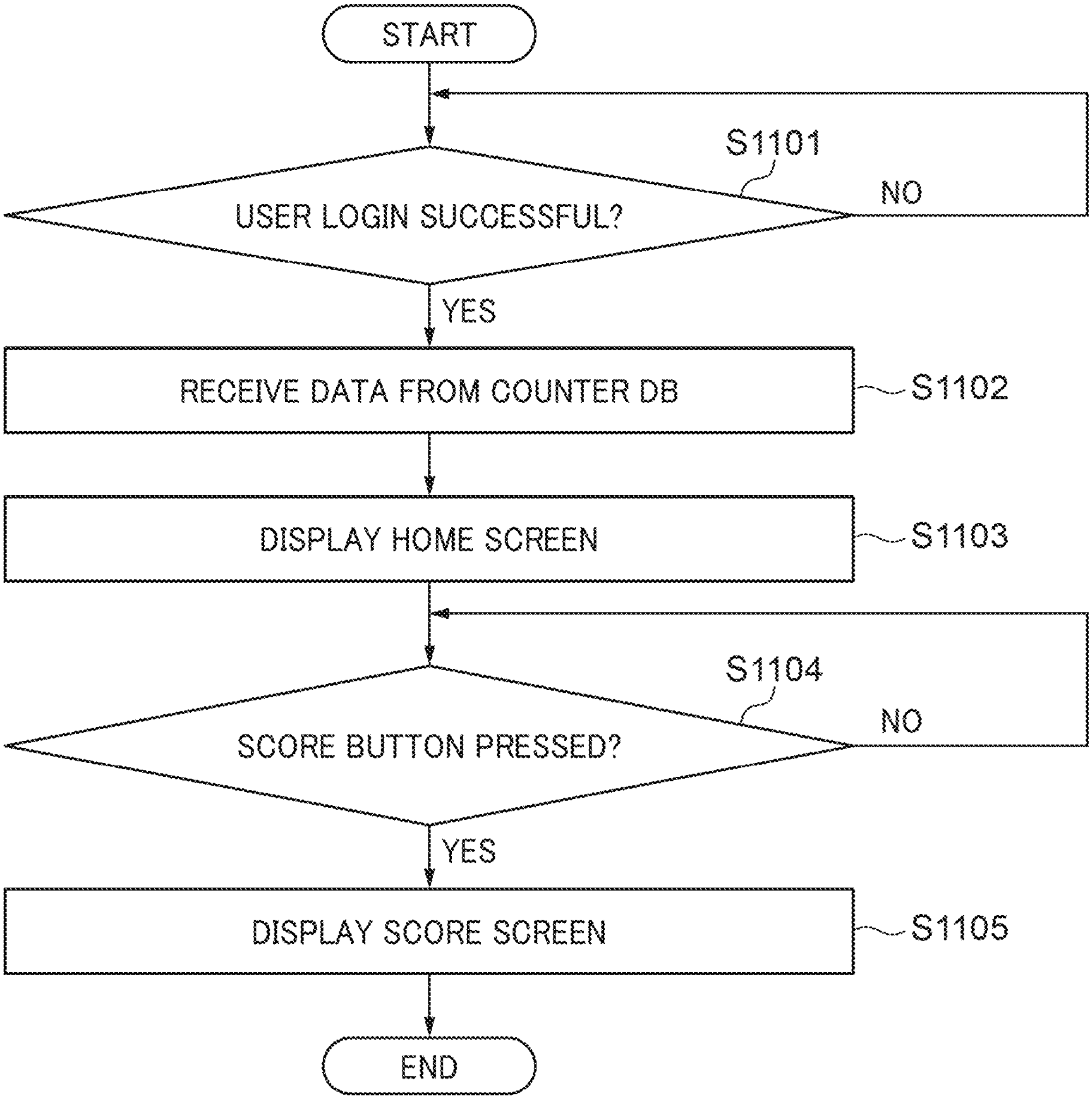
FIG. 11 is a flowchart of a copy process according to a fourth embodiment.

FIG. 11 is a flowchart of a copy process according to the fourth embodiment, which is performed by the image processing apparatus 101. Each processing (step) denoted by S number in this flowchart is realized by the CPU 111 of the controller 102, which performs centralized control of operations of the components of the image processing apparatus 101 by executing a predetermined program stored in the ROM 112 or the storage 114.

Processing operations in a step S1101 to a step S1103 are the same as the processing operations in the step S201 to S203 of the flowchart in FIG. 2, and hence description thereof is omitted.

Figure 13A:
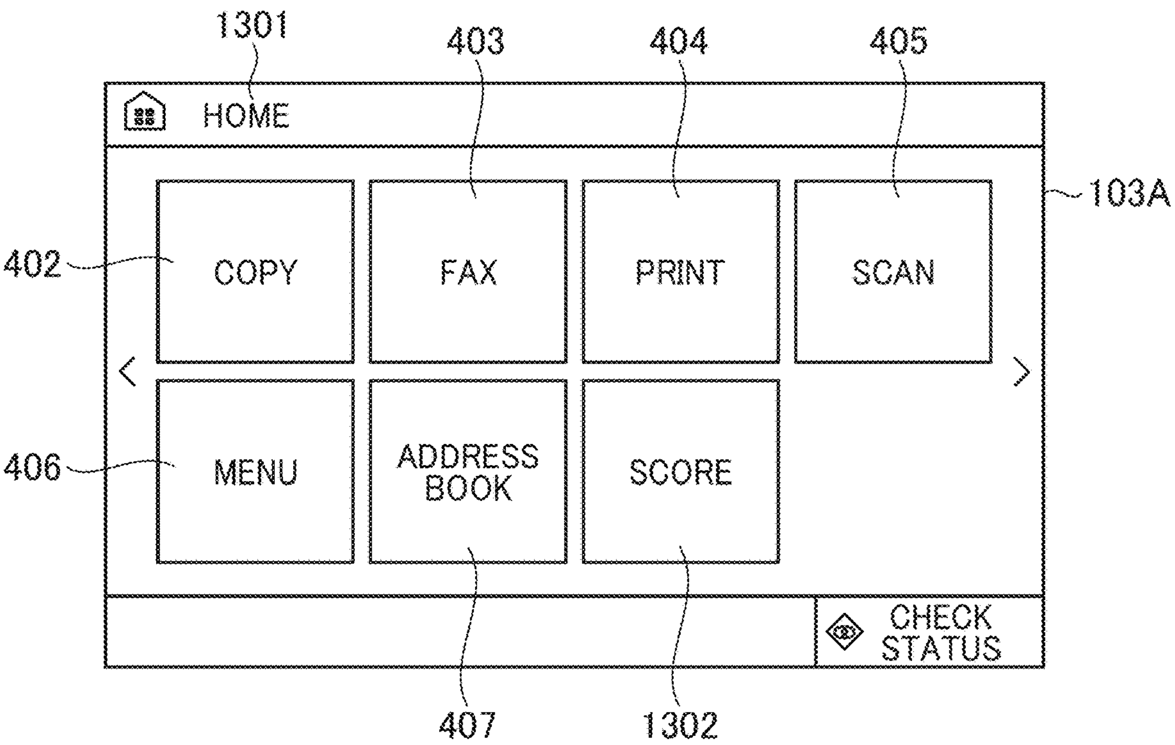
FIGS. 13A and 13B are diagrams showing an example of a variety of screens displayed on the display device in the fourth embodiment.

In a step S1104, the controller 102 determines whether or not a button of a score 1302 has been pressed on a home screen 1301 (see FIG. 13A). If it is determined that the button of the score 1302 has been pressed (YES to the step S1104), the controller 102 proceeds to a step S1105, whereas if it is determined that the button of the score 1302 has not been pressed (NO to the step S1104), the controller 102 executes the step S1104 again. In the step S1105, the controller 102 displays a score notification screen 1310 (see FIG. 13B) on the display device 103A, followed by terminating the present process.

FIG. 12 is a diagram showing an example of data managed by the counter DB in the fourth embodiment. Note that the same ones of the items managed by the counter DB in the fourth embodiment as the items managed by the counter DBs in the first, second and third embodiments (see FIGS. 3, 6, and 9) are denoted by the same reference numerals, and description thereof is omitted.

In the fourth embodiment, a decoloring toner printing use ratio score 1201, a reuse sheet use ratio score 1202 in the decoloring toner printing, and a total score 1203 are managed by the counter DB, based on predetermined criteria (scoring rule). Here, a scoring rule is used in which 10 points, 20 points, 30 points, and 40 points are provided for 0 to 25%, 26 to 50%, 51 to 75%, and 76% to 100%, respectively.

The decoloring toner printing use ratio score 1201 is a value obtained by scoring the decoloring toner printing use ratio 305 according to the above-mentioned scoring rule. The reuse sheet use ratio score 1202 in the decoloring toner printing is a value obtained by scoring the reuse sheet use ratio 607 in the decoloring toner printing according to the above-mentioned scoring rule. The total score 1203 is the sum of the decoloring toner printing use ratio score 1201 and the reuse sheet use ratio score 1202 in the decoloring toner printing. For example, a user A has 62.5% as the decoloring toner printing use ratio, to which 30 points are provided as the score, and 50% as the reuse sheet use ratio in the decoloring toner printing, to which 20 points are provided as the score, and as a result, 50 points are provided as the total score 1203.

Although the above-mentioned scoring rule linearly defines 10 points to 40 points for four sections, respectively, this is only an example. For example, the scoring rule can be a rule that provides points according to more finely divided sections, or provides a bonus point to the value of 100%, or linearly or exponentially (e.g. quadratically) provides points without using sections. Further, a predetermined scoring rule can be applied to a ratio obtained by weighting the decoloring toner printing use ratio and the reuse sheet use ratio in the decoloring toner printing. Calculation of the score can be performed with respect to only one of the decoloring toner printing use ratio and the reuse sheet use ratio in the decoloring toner printing.

FIG. 13A is a diagram showing an example of the home screen 1301 displayed on the display device 103A in the step S1103. The same ones of the buttons displayed on the home screen 1301 as the buttons displayed on the home screen 401 shown in FIG. 4A are denoted by the same reference numerals and description thereof is omitted. The home screen 1301 has the button of the score 1302. When the button of the score 1302 is pressed, the score of the logged-in user is displayed on the display device 103A.

Figure 13B:
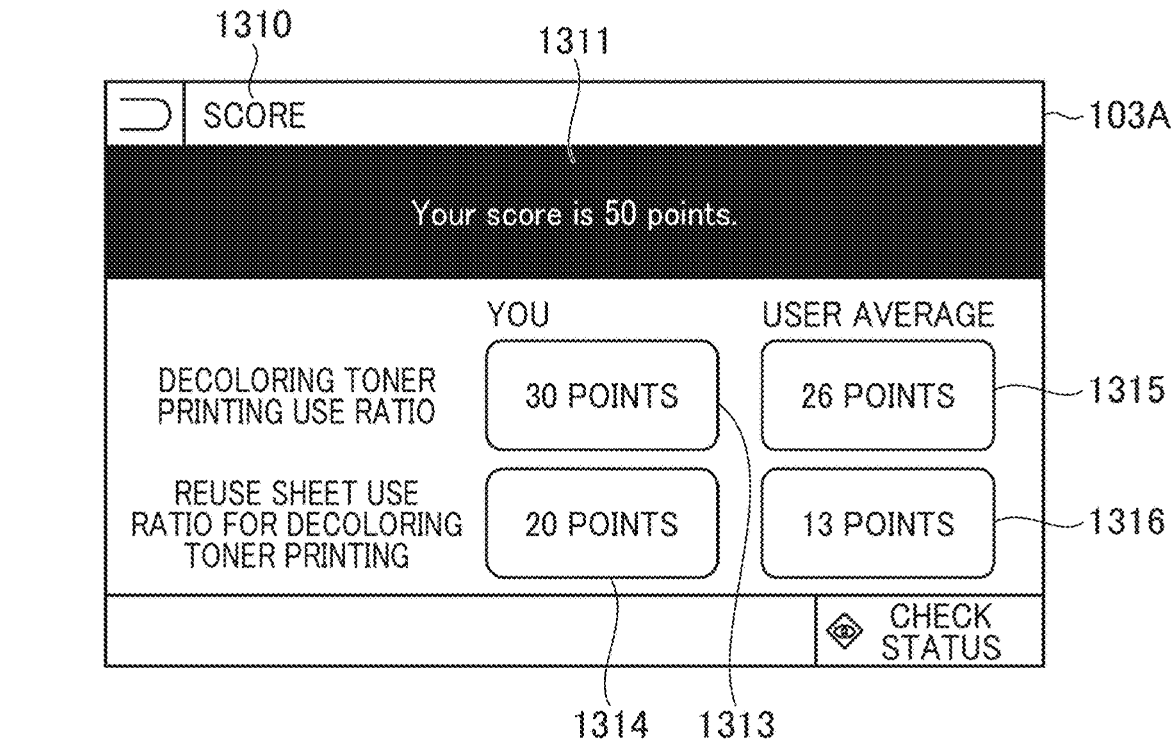

FIG. 13B is a diagram showing an example of the score notification screen 1310 displayed on the display device 103A when the button of the score 1302 is pressed. On the score notification screen 1310, a total score notification 1311 of the logged-in user is displayed. As the point on the total score notification 1311, a value of the total score 1203 in the counter DB shown in FIG. 12 is used. Note that in FIG. 13B, the score of the user A in FIG. 12 is displayed.

On the score notification screen 1310, not only the total score 1203, but also a score 1313 of the decoloring toner printing use ratio of the logged-in user and a score 1314 of the reuse sheet use ratio of the logged-in user in the decoloring toner printing are displayed together. The value of the score 1313 is a value of the score 1201 in the counter DB shown in FIG. 12, and the value of the score 1314 is a value of the score 1202 in the counter DB shown in FIG. 12. Further, on the score notification screen 1310, an average score 1315 of the decoloring toner printing use ratio and an average score 1316 of the reuse sheet use ratio in the decoloring toner printing, of all users managed by the counter DB, are displayed together.

The logged-in user can grasp the level of his/her own awareness of use of the decoloring toner printing as an objective value, compared with other users, by comparing his/her scores 1313 and 1314 with the average scores 1315 and 1316. Therefore, the score notification screen 1310 is expected to provide an effect of raising the awareness of use and interest in the decoloring toner printing of a user who has a low decoloring toner printing use ratio. Note that the items displayed on the score notification screen 1310 are not limited to those shown in FIG. 13B, but desired data can be extracted from a variety of data items managed by the counter DB for display.

In the above-described embodiments, the notification for recommending use of the decoloring toner printing is provided to a user who has a low decoloring toner printing use ratio, and further, the notification for recommending use of reuse sheets is provided to a user who has a low reuse sheet use ratio. Not only this, but a notification for prompting a user who has a high decoloring toner use ratio to maintain or further improve the current decoloring toner use ratio (for example, a notification "Please keep the current decoloring toner printing use ratio" or "Please make more use of the decoloring toner printing") can be provided. Similarly, a notification for prompting a user who has a high reuse sheet use ratio to maintain or further improve the current reuse sheet use ratio can be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application NO. 2023-098523 filed Jun. 15, 2023, which is hereby incorporated by reference herein in its entirety.

What is claimed is:

1. An image processing apparatus that is capable of performing image formation on recording sheets, by switchingly using decoloring toner and normal toner, comprising:

a count unit configured to count the number of sheets printed with the decoloring toner and the number of sheets printed with the normal toner with respect to the recording sheets on a user-by-user basis;

an acquisition unit configured to acquire a first use ratio of a logged-in user who has logged in the image processing apparatus, the first use ratio indicating a ratio of the number of sheets printed with the decoloring toner to a total number of the number of sheets printed with the decoloring toner and the number of sheets printed with the normal toner, based on counts counted by the count unit; and a notification unit configured to provide a first notification for recommending printing using the decoloring toner to the logged-in user in a case where the first use ratio is equal to or lower than a first threshold value.

2. The image processing apparatus according to claim 1, wherein the first threshold value is a predetermined value determined in advance or an average value of the first use ratio calculated for each of all users each registered as a user in the image processing apparatus.

3. The image processing apparatus according to claim 1, further comprising a display device, and wherein the notification unit displays the first notification on the display device.

4. The image processing apparatus according to claim 1, further comprising a speaker, and wherein the notification unit outputs the first notification using voice from the speaker.

5. The image processing apparatus according to claim 1, wherein the count unit counts the number of sheets printed with the decoloring toner and the number of sheets printed with the normal toner not on a user-by-user basis but on a group basis of a plurality of users.

6. The image processing apparatus according to claim 1, wherein the count unit separately counts the number of sheets printed with the decoloring toner and the number of sheets printed with the normal toner with respect to new sheets and reuse sheets, each used as the recording sheet, wherein the acquisition unit acquires a second use ratio indicating a ratio of the number of printed reuse sheets to the number of sheets printed with the decoloring toner, and wherein in a case where the second use ratio is equal to or lower than a second threshold value, the notification unit provides a second notification for recommending use of reuse sheets.

7. The image processing apparatus according to claim 6, further comprising a display device, and wherein the notification unit displays the second notification on the display device.

8. The image processing apparatus according to claim 6, further comprising a speaker, and wherein the notification unit outputs the second notification using voice from the speaker.

9. The image processing apparatus according to claim 6, further comprising a control unit configured to automatically set a recording sheet to be used for a print job, which is to be executed by the logged-in user, to a reuse sheet, in a case where the notification unit provides the second notification.

10. An image processing apparatus that is capable of performing image formation on recording sheets, by switchingly using decoloring toner and normal toner, comprising:

a setting unit configured to set an upper limit of the number of prints on a user-by-user, for users registered in the image processing apparatus;

a count unit configured to separately count the number of sheets printed with the decoloring toner and the number of sheets printed with the normal toner with respect to new sheets and reuse sheets, each used as the recording sheet, on a user-by-user basis; and a calculation unit configured to calculate a remaining printable sheets number by subtracting the number of printed new sheets and the number of printed reuse sheets, used for printing with the normal toner, from the upper limit of the number of prints and not to subtract the number of printed new sheets and the number of printed reuse sheets, used for printing with the decoloring toner, from the remaining printable sheets number.

11. The image processing apparatus according to claim 10, wherein the calculation unit performs processing for subtracting the number of printed new sheets used for printing with the decoloring toner from the remaining printable sheets number in place of processing for not subtracting the number of printed new sheets used for printing with the decoloring toner from the remaining printable sheets number.

12. An image processing apparatus that is capable of performing image formation on recording sheets, by switchingly using decoloring toner and normal toner, comprising:

a count unit configured to separately count the number of sheets printed with the decoloring toner and the number of sheets printed with the normal toner with respect to new sheets and reuse sheets, each used as the recording sheet, on a user-by-user basis, for users registered in the image processing apparatus;

a scoring unit configured to perform scoring with respect to a count obtained by the count unit based on predetermined criteria; and a control unit configured to display a result of the scoring on a display device.

13. The image processing apparatus according to claim 12, wherein the scoring unit provides, on a user-by-user basis, a larger point as a ratio of the number of sheets printed with the decoloring toner to a total number of the number of sheets printed with the decoloring toner and the number of sheets printed with the normal toner is higher, and provides a larger point as a ratio of the number of reuse sheets used for printing with the decoloring toner to the number of sheets printed with the decoloring toner is higher, based on the predetermined criteria.

14. An image processing apparatus that is capable of performing image formation on recording sheets, by switchingly using decoloring toner and normal toner, comprising:

a count unit configured to count the number of sheets printed with the decoloring toner and the number of sheets printed with the normal toner, with respect to the recording sheets, on a user-by-user basis;

an acquisition unit configured to acquire a decoloring toner use ratio of a logged-in user who has logged in the image processing apparatus, the decoloring toner use ratio indicating a ratio of the number of sheets printed with the decoloring toner to a total number of the number of sheets printed with the decoloring toner and the number of sheets printed with the normal toner, based on counts counted by the count unit; and a notification unit configured to provide, to the logged-in user, a notification for recommending printing using the decoloring toner, the notification having different contents varying with the decoloring toner use ratio.

15. An image processing apparatus that is capable of performing image formation on recording sheets, by switchingly using decoloring toner and normal toner, comprising:

an acquisition unit configured to acquire a parameter which makes it possible to estimate awareness of use of printing with the decoloring toner, on a user-by-user basis; and a notification unit configured to provide a notification for recommending printing using the decoloring toner to a user logged in the image processing apparatus in a case where the awareness of use of the user with respect to the printing with the decoloring toner is regarded to be low based on the parameter.

16. A method of controlling an image processing apparatus that is capable of performing image formation on recording sheets, by switchingly using decoloring toner and normal toner, comprising:

counting the number of sheets printed with the decoloring toner and the number of sheets printed with the normal toner, with respect to the recording sheets, on a user-by-user basis;

acquiring a decoloring toner use ratio of a logged-in user who has logged in the image processing apparatus, the decoloring toner use ratio indicating a ratio of the number of sheets printed with the decoloring toner to a total number of the number of sheets printed with the decoloring toner and the number of sheets printed with the normal toner, based on counts counted by said counting; and providing a notification for recommending printing using the decoloring toner to the logged-in user in a case where the decoloring toner use ratio is equal to or lower than a first threshold value.

17. A method of controlling an image processing apparatus that is capable of performing image formation on recording sheets, by switchingly using decoloring toner and normal toner, comprising:

setting an upper limit of the number of prints, on a user-by-user basis, for users registered in the image processing apparatus;

separately counting the number of sheets printed with the decoloring toner and the number of sheets printed with the normal toner with respect to new sheets and reuse sheets, each used as the recording sheet, on a user-by-user basis; and calculating a remaining printable sheets number by subtracting the number of printed new sheets and the number of printed reuse sheets, used for printing with the normal toner, from the upper limit of the number of prints, and not subtracting the number of printed new sheets and the number of printed reuse sheets, used for printing with the decoloring toner, from the remaining printable sheets number.

18. A method of controlling an image processing apparatus that is capable of performing image formation on recording sheets, by switchingly using decoloring toner and normal toner, comprising:

separately counting the number of sheets printed with the decoloring toner and the number of sheets printed with the normal toner with respect to new sheets and reuse sheets, each used as the recording sheet, on a user-by-user basis, for users registered in the image processing apparatus;

performing scoring with respect to a count obtained by said counting based on predetermined criteria; and displaying a result of the scoring on a display device.

19. A non-transitory computer-readable storage medium storing a program for causing a computer to execute a method of controlling an image processing apparatus that is capable of performing image formation on recording sheets, by switchingly using decoloring toner and normal toner, wherein the method comprises:

counting the number of sheets printed with the decoloring toner and the number of sheets printed with the normal toner, with respect to the recording sheets, on a user-by-user basis;

acquiring a decoloring toner use ratio of a logged-in user who has logged in the image processing apparatus, the decoloring toner use ratio indicating a ratio of the number of sheets printed with the decoloring toner to a total number of the number of sheets printed with the decoloring toner and the number of sheets printed with the normal toner, based on counts counted by said counting; and providing a notification for recommending printing using the decoloring toner to the logged-in user in a case where the decoloring toner use ratio is equal to or lower than a first threshold value.

* * * * *